(12) United States Patent
Hirata et al.

(10) Patent No.: US 10,734,875 B2
(45) Date of Patent: Aug. 4, 2020

(54) ROTARY ELECTRIC MACHINE AND ROTARY ELECTRIC MACHINE CONTROLLER

(71) Applicant: OSAKA UNIVERSITY, Osaka (JP)

(72) Inventors: Katsuhiro Hirata, Osaka (JP); Noboru Niguchi, Osaka (JP); Yuki Ohno, Osaka (JP); Akira Kohara, Osaka (JP); Masayuki Katoh, Osaka (JP); Hajime Ukaji, Osaka (JP); Teiichirou Chiba, Kanagawa (JP)

(73) Assignee: OSAKA UNIVERSITY, Osaka (JP)

( * ) Notice: Subject to any disclaimer, the term of this patent is extended or adjusted under 35 U.S.C. 154(b) by 159 days.

(21) Appl. No.: 15/315,725

(22) PCT Filed: Jun. 2, 2015

(86) PCT No.: PCT/JP2015/065948
§ 371 (c)(1),
(2) Date: Dec. 1, 2016

(87) PCT Pub. No.: WO2015/186714
PCT Pub. Date: Dec. 10, 2015

(65) Prior Publication Data
US 2017/0093257 A1 Mar. 30, 2017

(30) Foreign Application Priority Data

Jun. 2, 2014 (JP) .................................. 2014-113771
Nov. 28, 2014 (JP) .................................. 2014-242388

(51) Int. Cl.
*H02K 1/27* (2006.01)
*H02K 19/10* (2006.01)
(Continued)

(52) U.S. Cl.
CPC ........... *H02K 19/103* (2013.01); *H02K 1/246* (2013.01); *H02K 1/274* (2013.01); *H02K 11/33* (2016.01);
(Continued)

(58) Field of Classification Search
CPC ........... H02K 1/04–06; H02K 1/22–24; H02K 19/103; H02K 16/02; H02K 21/04;
(Continued)

(56) References Cited

U.S. PATENT DOCUMENTS 5,541,493 A 7/1996 Watanabe
5,936,372 A 8/1999 Nashiki et al.
(Continued)

FOREIGN PATENT DOCUMENTS

EP 0959555 A2 11/1999
GB 2499332 A 8/2013
(Continued)

OTHER PUBLICATIONS

Noboru Niguchi et al., "Variable Flux Reluctance Machine without DC-Field Coils", The Institute of Electrical Engineers of Japan, Aug. 6, 2014, pp. 1-6.
(Continued)

*Primary Examiner* — Emily P Pham
*Assistant Examiner* — Bryan R Perez
(74) *Attorney, Agent, or Firm* — Hauptman Ham, LLP

(57) ABSTRACT

A rotary electric machine includes a rotor that rotates around a rotation axis serving as a center and has a plurality of salient poles protruding in directions perpendicular to the rotation axis, and a stator that includes an annular structural body disposed radially outside the rotor and surrounding the rotor, and 6×n windings provided along a circumferential direction of the structural body, a field signal for generating field magnetic flux and a drive signal for driving the rotor as
(Continued)

a three-phase rotary electric machine being superimposed on each other to be input to each of the windings. n is a natural number equal to or larger than one.

12 Claims, 18 Drawing Sheets

(51) Int. Cl.
  *H02K 1/24*    (2006.01)
  *H02K 11/33*   (2016.01)
  *H02P 21/12*   (2016.01)
  *H02K 16/02*   (2006.01)
  *H02K 51/00*   (2006.01)
  *H02P 7/298*   (2016.01)
  *H02K 3/28*    (2006.01)

(52) U.S. Cl.
  CPC ............ *H02K 16/02* (2013.01); *H02K 51/00* (2013.01); *H02P 7/298* (2013.01); *H02P 21/12* (2013.01); *H02K 3/28* (2013.01)

(58) Field of Classification Search
  CPC ...... H02K 2213/03; H02K 1/246; H02K 1/27; H02K 1/274; H02K 19/10; H02K 51/00; H02K 11/33; H02P 21/12; H02P 7/298
  See application file for complete search history.

(56) References Cited

U.S. PATENT DOCUMENTS

| | | |
|---|---|---|
| 8,922,153 B2 | 12/2014 | Nashiki et al. |
| 2012/0169267 A1 | 7/2012 | Nashiki et al. |
| 2013/0113318 A1* | 5/2013 | Nishiyama ............ H02K 21/44 310/114 |
| 2013/0221778 A1 | 8/2013 | Kusase |
| 2013/0314021 A1* | 11/2013 | Yamada ............... H02K 21/042 318/718 |
| 2015/0076948 A1* | 3/2015 | Katou ...................... H02K 7/11 310/103 |
| 2017/0019005 A1* | 1/2017 | Tojima ................... H02K 29/03 |

FOREIGN PATENT DOCUMENTS

| | | |
|---|---|---|
| JP | 6-178576 A | 6/1994 |
| JP | 9-327192 A | 12/1997 |
| JP | 2005-51954 A | 2/2005 |
| JP | 2008-92701 A | 4/2008 |
| JP | 2012-114975 A | 6/2012 |
| JP | 2013-201869 A | 10/2013 |

OTHER PUBLICATIONS

International Search Report in PCT/JP2015/065948, dated Sep. 1, 2015.

Extended European Search Report in EP Application No. 15804016.2, dated Dec. 8, 2017, 10pp.

* cited by examiner

ROTARY ELECTRIC MACHINE AND ROTARY ELECTRIC MACHINE CONTROLLER

RELATED APPLICATIONS

The present application is a National Phase of International Application Number PCT/JP2015/065948, filed on Jun. 2, 2015, which claims priority to Japanese Patent Applications Number 2014-113771, filed on Jun. 2, 2014 and Number 2014-242388, filed on Nov. 28, 2014.

FIELD

The present invention relates to a rotary electric machine and a rotary electric machine controller.

BACKGROUND

There have been electric machines provided with armature windings and field windings (e.g., Patent Literature 1)

CITATION LIST

Patent Literature

Patent Literature 1: Japanese Patent Application Laid-open No. 2013-201869

SUMMARY

Technical Problem

The invention described in Patent Literature 1 includes the armature windings and the field windings. A controller that controls the rotary machine described in Patent Literature 1 needs a circuit for field excitation and a circuit for driving, thereby having a complicated structure.

The invention aims to allow a simple device to control both of field magnetic flux and armature magnetic flux of a rotary electric machine.

Solution to Problem

According to the present invention, there is provided a rotary electric machine, comprising: a rotor that rotates around a rotation axis serving as a center and includes a plurality of salient poles protruding in directions perpendicular to the rotation axis; and a stator that includes an annular structural body disposed radially outside the rotor and surrounding the rotor, and 6×n windings provided along a circumferential direction of the structural body, a field signal for generating field magnetic flux and a drive signal for driving the rotor as a three-phase rotary electric machine being superimposed on each other to be input to each of the windings, n being a natural number equal to or larger than one. The rotary electric machine is an apparatus that includes at least one of a function of an electric generator producing electric power and a function of an electric motor receiving electric power and generating power.

It is preferable that $m-k=p$ holds where m is the number of salient poles, k is an order of the field magnetic flux, p is an order of magnetic flux of an armature generated when the drive signals for driving the rotor as the three-phase rotary electric machine are applied to the windings, and p, m, and k are natural numbers each equal to or larger than one.

It is preferable that the field signal is a direct-current voltage or an alternate-current voltage having a certain period.

According to the present invention, there is provided a rotary electric machine controller that controls a rotary electric machine including a rotor rotating around a rotation axis serving as a center and including a plurality of salient poles protruding in directions perpendicular to the rotation axis, an annular structural body disposed radially outside the rotor and surrounding the rotor, and 6×n windings provided along a circumferential direction of the structural body, and satisfies $m-k=p$ where m is the number of salient poles, k is an order of field magnetic flux, p is an order of magnetic flux of an armature generated when drive signals for driving the rotary electric machine as a three-phase rotary electric machine are applied to the windings, wherein the rotary electric machine controller performs superimposition of a field signal for causing the rotary electric machine to generate the field magnetic flux and the drive signal for driving the rotary electric machine as the three-phase rotary electric machine, and outputs a signal obtained by the superimposition to each of the windings, and p, m, and k are natural numbers each equal to or larger than one.

According to the present invention, there is provided a rotary electric machine, comprising: a first rotor that rotates around a rotation axis serving as a center and includes a plurality of first magnetic poles protruding in directions perpendicular to the rotation axis; a second rotor that is provided radially outside the first rotor, includes second magnetic poles the number of which is larger than the number of first magnetic poles, and rotates around the rotation axis as the center; and a stator that includes an annular structural body disposed radially outside the second rotor and surrounding the second rotor, and 6×n windings provided along a circumferential direction of the structural body, a field signal for generating field magnetic flux and a drive signal for driving the first rotor as a three-phase rotary electric machine being superimposed on each other to be input to each of the windings, wherein $m1=k+p$ and $m2=2\times k+m1$ hold where m1 is the number of first magnetic poles, m2 is the number of second magnetic poles, k is an order of the field magnetic flux, p is an order of magnetic flux of an armature generated when the drive signals for driving the first rotor as the three-phase rotary electric machine are applied to the windings, and n, p, m1, m2, and k are natural numbers each equal to or larger than one.

It is preferable that the field signal is a direct-current voltage or an alternate-current voltage having a certain period.

According to the present invention, there is provided a rotary electric machine controller that controls a rotary electric machine including a first rotor rotating around a rotation axis serving as a center and including a plurality of first magnetic poles protruding in directions perpendicular to the rotation axis, a second rotor provided radially outside the first rotor, having second magnetic poles the number of which is larger than the number of first magnetic poles, and rotating around the rotation axis as the center, and a stator having an annular structural body disposed radially outside the second rotor and surrounding the second rotor and having 6×n windings provided along a circumferential direction of the structural body, a field signal for generating field magnetic flux and a drive signal for driving the first rotor as a three-phase rotary electric machine being superimposed on each other to be input to each of the windings, and satisfies $m1=k+p$ and $m2=2\times k+m1$ where m1 is the number of first magnetic poles, m2 is the number of second magnetic poles, k is an order of the field magnetic flux, p is an order of magnetic flux of an armature generated when the drive signals for driving the rotary electric machine as the three-phase rotary electric machine are applied to the windings. With regard to the controlling of the rotary electric machine, the rotary electric machine controller performs superimposition of the field signal for causing the rotary electric machine to generate the field magnetic flux and the drive signal for driving the rotary electric machine as the three-phase rotary electric machine, and outputs a signal obtained by the superimposition to each of the windings. n, p, m1, m2, and k are natural numbers each equal to or larger than one.

Advantageous Effects of Invention

The invention allows the simple device to control both of the field magnetic flux and the armature magnetic flux of the rotary electric machine.

DESCRIPTION OF EMBODIMENTS

The following describes embodiments of the invention in detail with reference to the accompanying drawings.

<Structure of Rotary Electric Machine>

Figure 1:
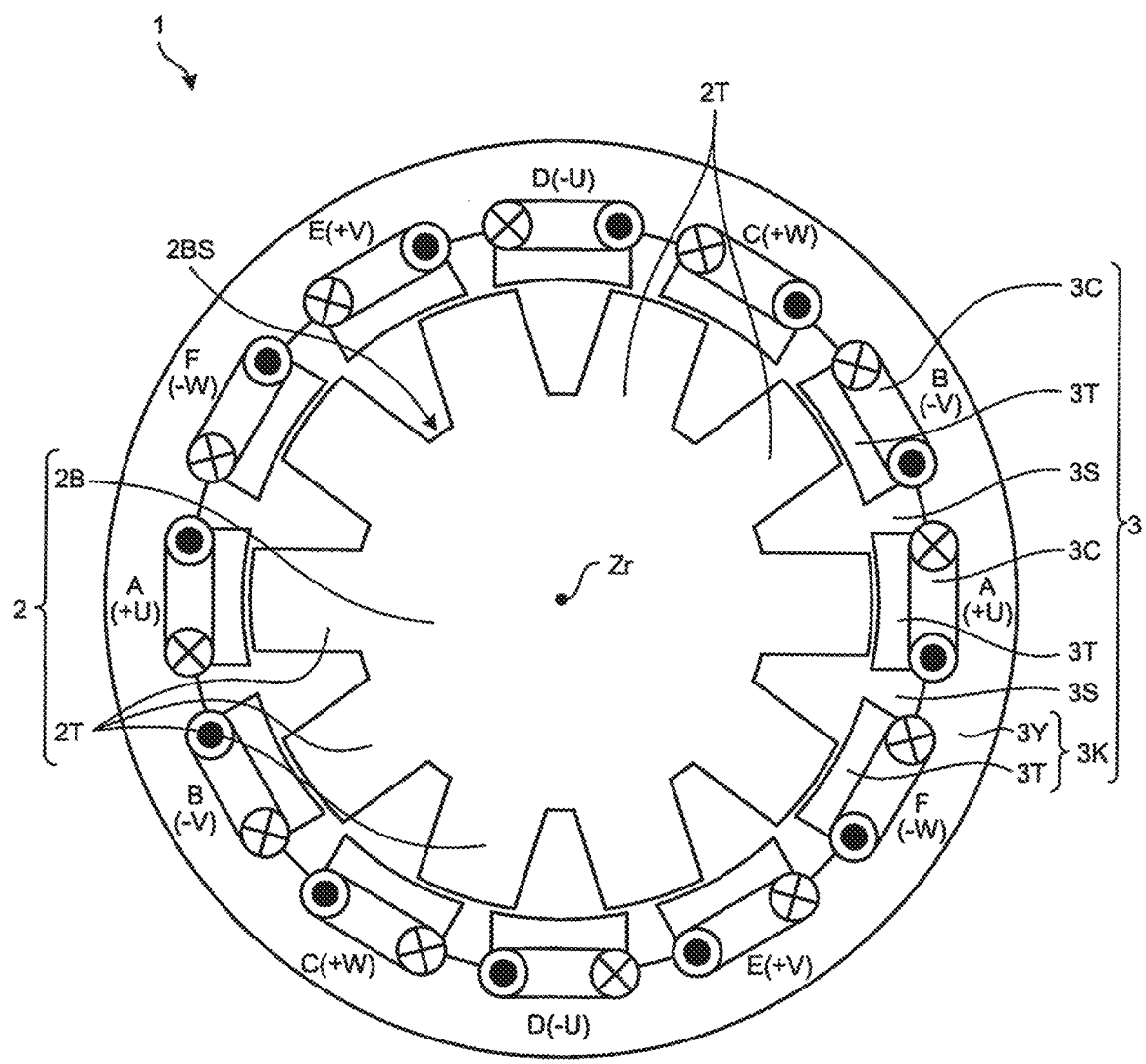
FIG. 1 is a cross-sectional view taken by cutting a rotary electric machine according to a first embodiment with a plane passing through and including a rotation axis thereof.
Figure 2:
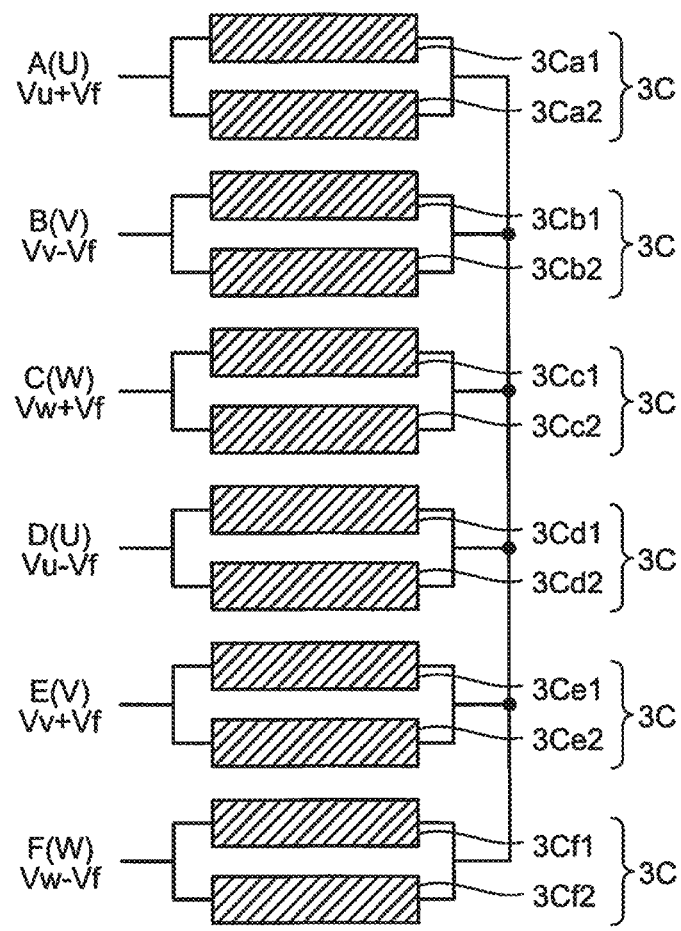
FIG. 2 is a schematic diagram illustrating wiring of windings included in the rotary electric machine according to the first embodiment.

FIG. 1 is a cross-sectional view taken by cutting a rotary electric machine 1 according to a first embodiment with a plane passing through and including a rotation axis Zr thereof. FIG. 2 is a schematic diagram illustrating wiring of windings 3C included in the rotary electric machine 1 according to the first embodiment. The rotary electric machine 1 includes a rotor 2 and a stator 3. The rotor 2 rotates around the rotation axis Zr serving as the center. The rotor 2 has a main body 2B and a plurality of salient poles 2T. The multiple salient poles 2T protrude from a surface 2BS of the main body 2B in directions perpendicular to the rotation axis Zr. In the embodiment, the rotor 2 is provided with 10 salient poles 2T. The number of salient poles 2T is, however, not limited to 10. The rotor 2 is manufactured by layering magnetic steel sheets, for example.

The stator 3 has a stator core 3K serving as an annular structural body that is disposed radially outside the rotor 2 and surrounds the rotor 2, and the multiple windings 3C mounted on the structural body. The stator core 3K has an annular yoke 3Y and a plurality of salient poles 3T provided inside the yoke 3Y, i.e., on the rotor 2 side of the yoke 3Y. The multiple salient poles 3T are provided along a circumferential direction of the yoke 3Y. Slots 3S are formed between adjacent salient poles 3T. The windings 3C are provided to the slots 3S. In the embodiment, the windings 3C are provided to the salient poles 3T and the slots 3S by concentrated winding. The stator core 3K is manufactured by layering magnetic steel sheets, for example.

The electric wire forming the winding 3C is a conductor. A copper wire or an aluminum wire is used for the electric wire, for example. The stator 3 may be the structural body that is provided with the salient poles 3T around which the windings 3C are wound and is molded with a resin. This makes it possible to integrate the structural body and the windings. As a result, the stator 3 is easily handled.

Each winding 3C is wound around the corresponding salient pole 3T to be provided in the slots 3S. In the embodiment, the stator 3 is provided with 12 windings 3C. The number of windings 3C is not limited to 12. The number of windings 3C is an integer multiple of six, i.e., 6×n (n is a natural number). The number of salient poles 3T and the number of slots 3S each equal to the number of windings 3C, i.e., 6×n (n is a natural number). The windings 3C are provided along the circumferential direction of the annular structural body, more specifically, the yoke 3Y.

The windings 3C of the rotary electric machine 1 function as both armature windings and field windings. The rotary electric machine 1 modulates a magnetic field generated by the windings 3C functioning as the field windings by the salient poles 2T, which are magnetic poles of the rotor 2, and synchronizes the modulated magnetic field with a magnetic field generated by the windings 3C functioning as the armature windings to rotate the rotor 2. Thus, a field signal for generating field magnetic flux and a drive signal for driving the rotor 2 as a three-phase rotary electric machine are superimposed on each other and the resulting signal is input to each of the windings 3C. The signal in which the field signal and the drive signal are superimposed on each other is appropriately described as a combined drive signal.

In FIGS. 1 and 2, symbols A, B, C, D, E, F, U, V, and W represent respective phases of the windings 3C. In the embodiment, windings 3Ca1 and 3Ca2 correspond to phase A, windings 3Cb1 and 3Cb2 correspond to phase B, windings 3Cc1 and 3Cc2 correspond to phase C, windings 3Cd1 and 3Cd2 correspond to phase D, windings 3Ce1 and 3Ce2 correspond to phase E, and windings 3Cf1 and 3Cf2 correspond to phase F. In the embodiment, the respective windings 3C corresponding to one of phases A to F are connected in parallel. They may be connected in series.

To the windings 3Ca1 and 3Ca2 corresponding to phase A and the windings 3Cd1 and 3Cd2 corresponding to phase D, U phase of the drive signal for driving the rotary electric machine 1 as a three-phase rotary electric machine is input. To the windings 3Cb1 and 3Cb2 corresponding to phase B and the windings 3Ce1 and 3Ce2 corresponding to phase E, V phase of the drive signal for driving the rotary electric machine 1 is input. To the windings 3Cc1 and 3Cc2 corresponding to phase C and the windings 3Cf1 and 3Cf2 corresponding to phase F, W phase of the drive signal for driving the rotary electric machine 1 is input.

(1) To the windings 3Ca1 and 3Ca2 corresponding to phase A and phase U, the resulting signal after superimposition of a drive voltage Vu corresponding to phase U of the drive signal and a field voltage +Vf serving as the field signal for causing the rotary electric machine 1 to generate the field magnetic flux is applied.

(2) To the windings 3Cb1 and 3Cb2 corresponding to phase B and phase V, the resulting signal after superimposition of a drive voltage Vv corresponding to phase V of the drive signal and a field voltage −Vf serving as the field signal for causing the rotary electric machine 1 to generate the field magnetic flux is applied.

(3) To the windings 3Cc1 and 3Cc2 corresponding to phase C and phase W, the resulting signal after superimposition of a drive voltage Vw corresponding to phase W of the drive signal and the field voltage +Vf serving as the field signal for causing the rotary electric machine 1 to generate the field magnetic flux is applied.

(4) To the windings 3Cd1 and 3Cd2 corresponding to phase D and phase U, the resulting signal after superimposition of a drive voltage Vu corresponding to phase U of the drive signal and the field voltage −Vf serving as the field signal for causing the rotary electric machine 1 to generate the field magnetic flux is applied.

(5) To the windings 3Ce1 and 3Ce2 corresponding to phase E and phase V, the resulting signal after superimposition of a drive voltage Vv corresponding to phase V of the drive signal and the field voltage +Vf serving as the field signal for causing the rotary electric machine 1 to generate the field magnetic flux is applied.

(6) To the windings 3Cf1 and 3Cf2 corresponding to phase F and phase W, the resulting signal after superimposition of a drive voltage Vw corresponding to phase W of the drive signal and the field voltage −Vf serving as the field signal for causing the rotary electric machine 1 to generate the field magnetic flux is applied. The drive voltages Vu, Vv, and Vw are alternating-current voltages. The field voltages +Vf and −Vf are direct-current voltages.

Figure 3:
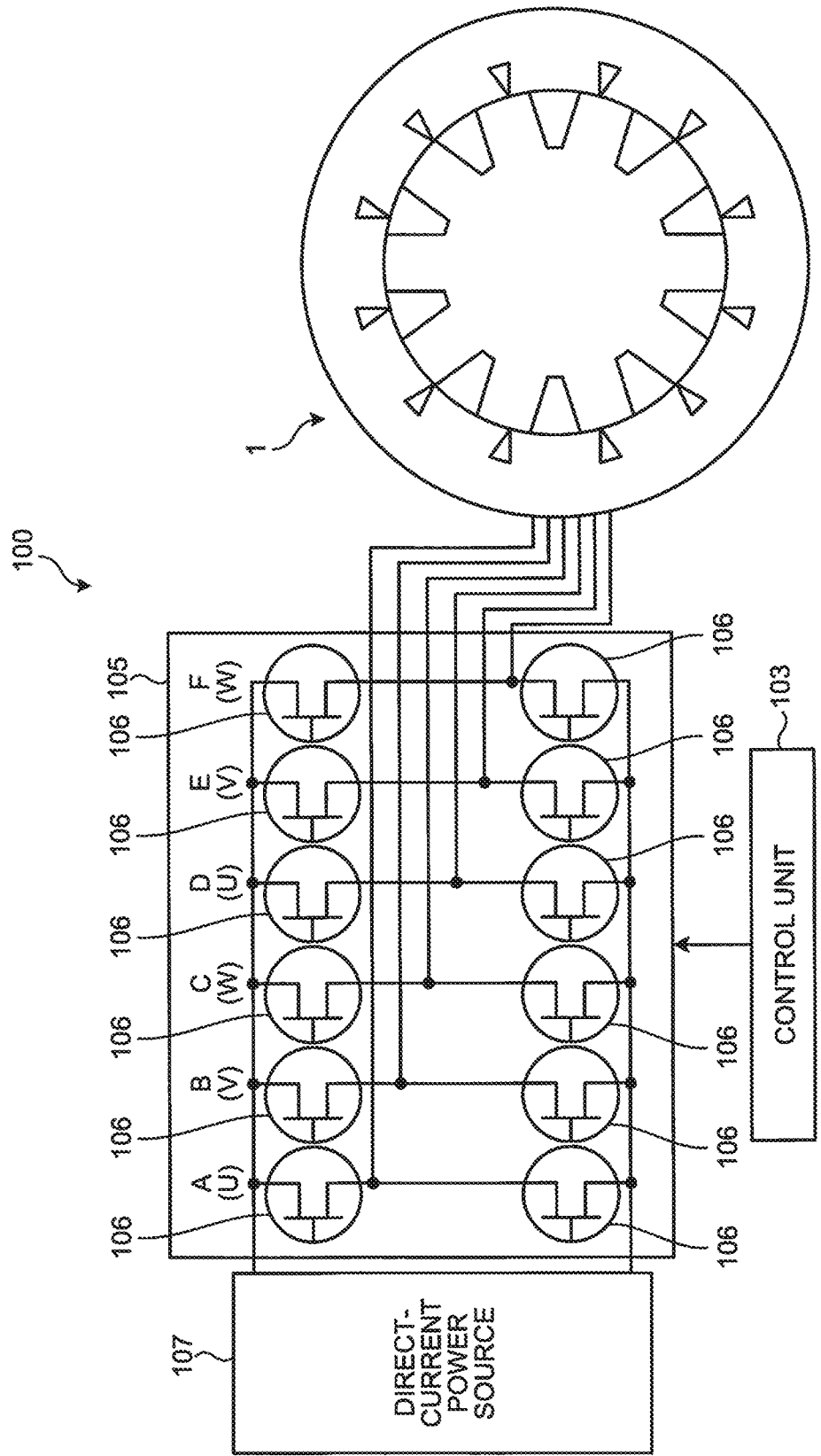
FIG. 3 is a schematic diagram illustrating the rotary electric machine and a rotary electric machine controller that controls the rotary electric machine according to the first embodiment.

FIG. 3 is a schematic diagram illustrating the rotary electric machine 1 according to the first embodiment and a rotary electric machine controller 100 that controls the rotary electric machine 1. In the rotary electric machine 1 illustrated in FIG. 3, the windings 3C illustrated in FIG. 1 are omitted. The rotary electric machine 1 is controlled by the rotary electric machine controller (hereinafter, appropriately described as the controller) 100. The controller 100 includes a control unit 103 and an inverter 105. The control unit 103 produces control signals that cause the rotary electric machine 1 to generate the field magnetic flux and drive the rotary electric machine 1 as a three-phase rotary electric machine. The inverter 105 is operated by the control signals produced by the control unit 103 and produces the combined drive signals from direct-current power supplied from a direct-current power source 107.

The inverter 105 applies, to the respective windings 3Ca1 to 3Ce2 illustrated in FIG. 2, control voltages in which the field voltages of +Vf and −Vf serving as the field signals for generating the field magnetic flux and the drive signals Vu, Vv, and Vw serving the drive signals for driving the rotor 2 as a three-phase rotary electric machine are imposed on one another. The inverter 105 that controls the rotary electric machine 1 is a six-phase inverter, and has 12 switching elements 106 forming a full-bridge circuit. The type of the switching element 106 is not limited to any specific type. An insulated gate bipolar transistor (IGBT) is used for the switching element 106, for example. The control signals produced by the control unit 103 are input to the gates of the respective switching elements 106 included in the inverter 105.

Figure 4:
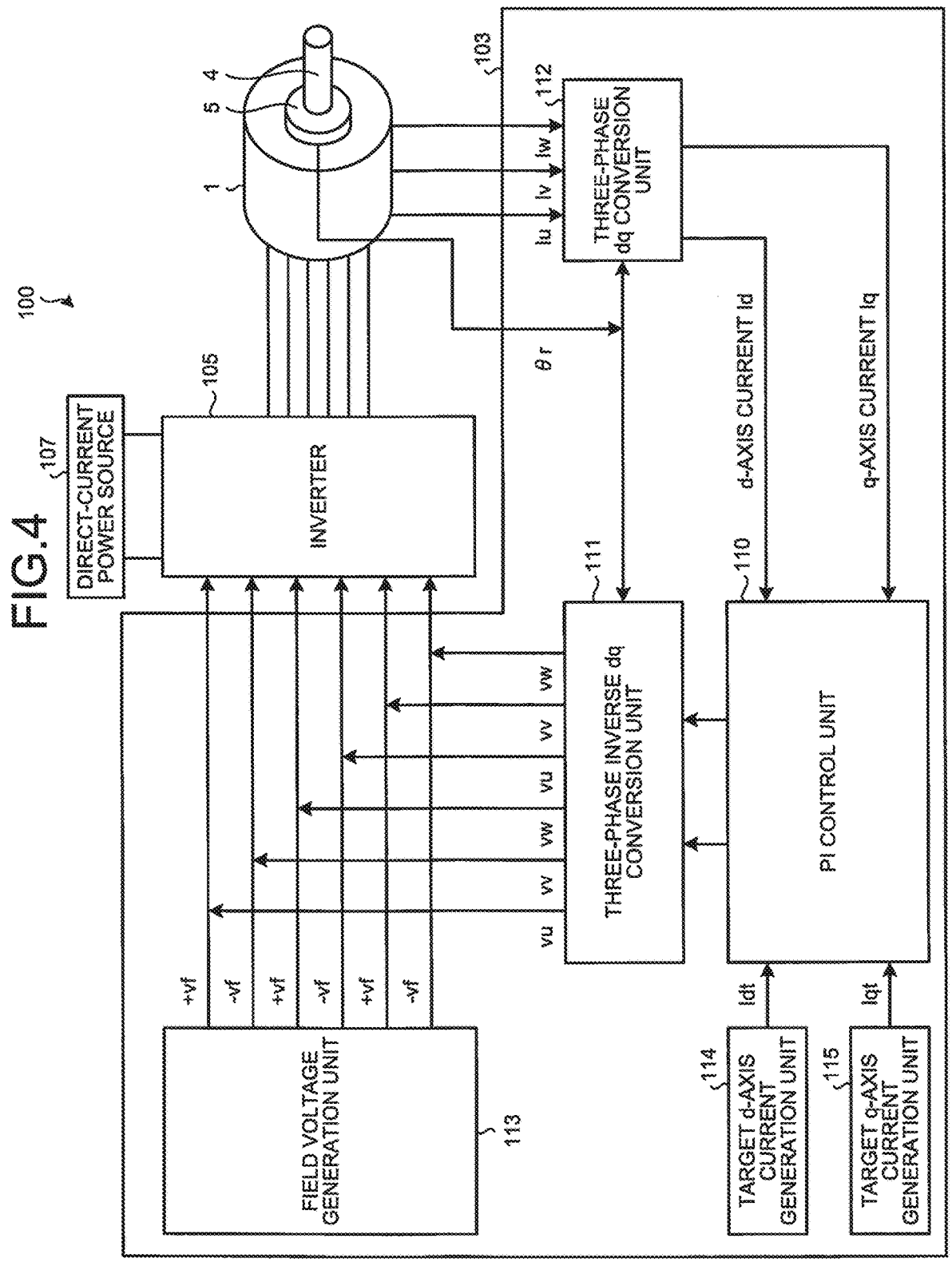
FIG. 4 is a schematic diagram for explaining a control unit of the controller.

FIG. 4 is a schematic diagram for explaining the control unit 103 of the controller 100. The control unit 103 includes a proportion and integration (PI) control unit 110, a three-phase inverse dq conversion unit 111, a three-phase dq conversion unit 112, a field voltage generation unit 113, a target d-axis current generation unit 114, and a target q-axis current generation unit 115. The PI control unit 110 produces current command values for a d-axis current and a q-axis current such that phase U, phase V and phase W currents supplied to the rotary electric machine 1 by the inverter 105 become a target d-axis current Idt produced by the target d-axis current generation unit 114 and a target q-axis current Iqt produced by the target q-axis current generation unit 115.

The three-phase dq conversion unit 112 performs dq conversion converting a phase U current Iu, a phase V current Iv, and a phase W current Iw that are supplied from the inverter 105 to the rotary electric machine 1 into a d-axis current Id and a q-axis current Iq. The phase U current Iu of the rotary electric machine 1 is obtained by combining the phase A current and the phase D current. Phase U, phase A, and phase D are the same phase. The phase V current Iv of the rotary electric machine 1 is obtained by combining the phase B current and the phase E current. Phase V, phase B, and phase E are the same phase. The phase W current Iw of the rotary electric machine 1 is obtained by combining the phase C current and the phase F current. Phase W, phase C, and phase F are the same phase.

In the dq conversion, the three-phase dq conversion unit 112 uses a rotation angle θr of the rotor 2 of the rotary electric machine 1 illustrated in FIG. 1. An output shaft 4 is connected to the rotor 2 illustrated in FIG. 1. The rotation angle of the output shaft 4 is, thus, the rotation angle θr of the rotor 2. The rotation angle of the output shaft 4 is detected by a rotation angle sensor 5 that detects the rotation angle of the output shaft 4 of the rotary electric machine 1.

The PI control unit 110 acquires the d-axis current Id and the q-axis current Iq of the rotary electric machine 1, which are converted by the three-phase dq conversion unit 112, and produces voltage command values such that a difference between the target d-axis current Idt and the d-axis current Id and a difference between the target q-axis current Iqt and the q-axis current Iq respectively become zero. The three-phase inverse dq conversion unit 111 performs inverse dq conversion on the voltage command values produced by the PI control unit 110 to produce a phase U voltage command value vu, a phase V voltage command value vv, and a phase W voltage command value vw. In the inverse dq conversion, the three-phase inverse dq conversion unit 111 uses the rotation angle θr of the rotor 2. The field voltage generation unit 113 produces the field voltage command values necessary to cause the rotary electric machine 1 to generate the field magnetic flux. The field voltage command values are produced as +Vf, −Vf, +Vf, −Vf, +Vf, and −Vf corresponding to the respective six phases of phase A to phase F.

The control unit 103 produces the control signals by the respective superimposition of the voltage command values vu, vv, and vw produced by the three-phase inverse dq conversion unit 111 and the field voltage command values +Vf, −Vf, +Vf, −Vf, +Vf, and −Vf produced by the field voltage generation unit 113. The control unit 103 outputs the produced control signals to the inverter 105. The control signal to the windings 3Ca1 and 3Ca2 is vu+vf, the control signal to the windings 3Cb1 and 3Cb2 is vv−vf, the control signal to the windings 3Cc1 and 3Cc2 is vw+vf, the control signal to the windings 3Cd1 and 3Cd2 is vu−vf, the control signal to the windings 3Ce1 and 3Ce2 is vv+vf, and the control signal to the windings 3Cf1 and 3Cf2 is vw−vf, as illustrated in FIG. 2. As a result of input of the signals to the inverter 105, the inverter 105 applies the combined drive voltage Vu+Vf to the windings 3Ca1 and 3Ca2, the combined drive voltage Vv−Vf to the windings 3Cb1 and 3Cb2, the combined drive voltage Vw+Vf to the windings 3Cc1 and 3Cc2, the combined drive voltage Vu−Vf to the windings 3Cd1 and 3Cd2, the combined drive voltage Vv+Vf to the windings 3Ce1 and 3Ce2, and the combined drive voltage Vw−Vf to the windings 3Cf1 and 3Cf2.

Figure 5:
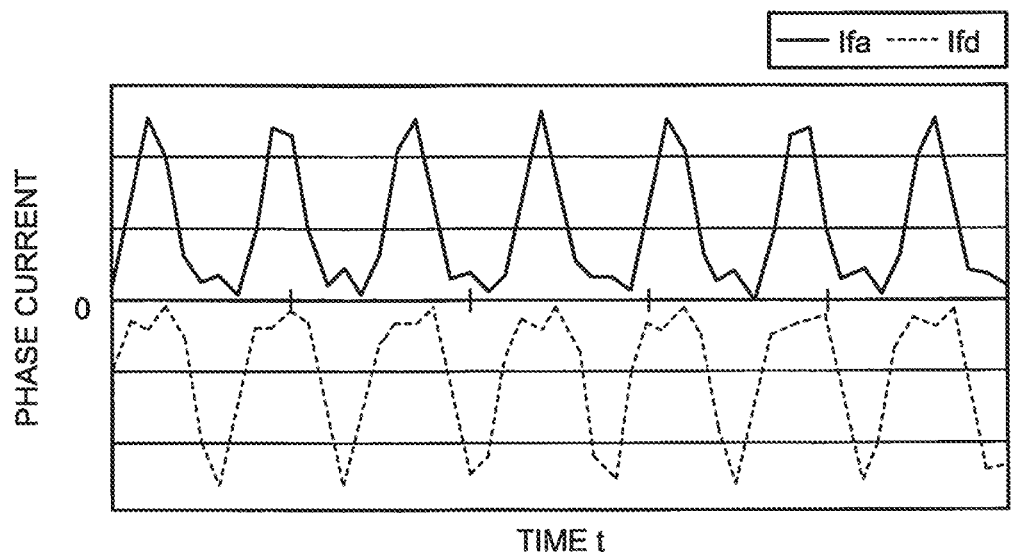
FIG. 5 is a schematic diagram illustrating a relation between phase currents of the rotary electric machine according to the first embodiment and time.
Figure 6:
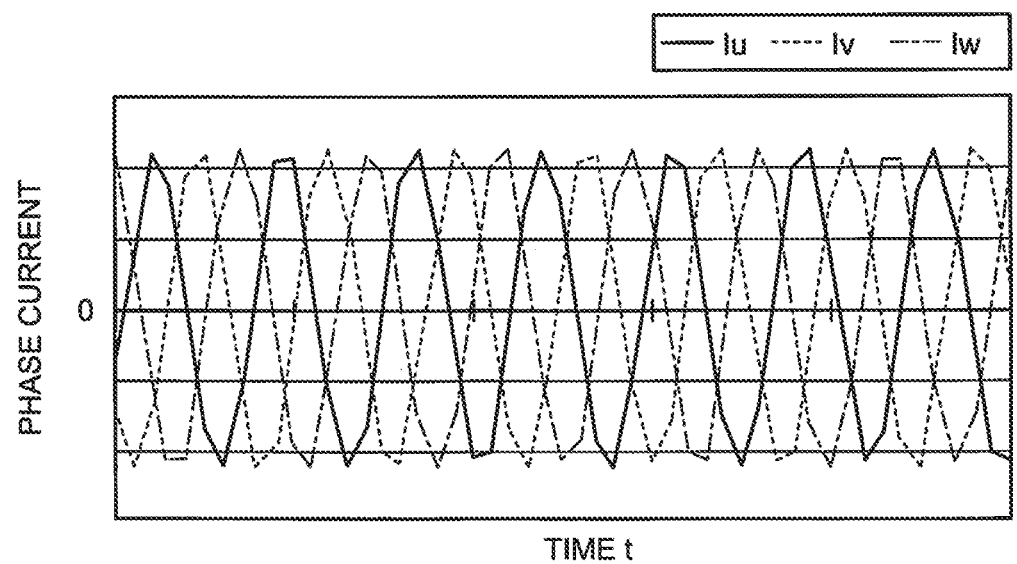
FIG. 6 is another schematic diagram illustrating a relation between the phase currents of the rotary electric machine according to the first embodiment and time.

FIGS. 5 and 6 are schematic diagrams each illustrating a relation between phase currents of the rotary electric machine 1 according to the first embodiment and time t. FIG. 5 illustrates changes of phase currents Ifa and Ifd respectively corresponding to phase A and phase D, which are illustrated in FIG. 2, with respect to time t. FIG. 6 illustrates changes of phase currents Iu, Iv, and Iw respectively corresponding to phase U, phase V, and phase W, which are illustrated in FIG. 2, with respect to time t. The phase current Ifa of phase A is equal to or larger than zero while the phase current Ifd of phase D is equal to or smaller than zero because a field current Ix is added to the phase current Ifa of phase A and the phase current Ifd of phase D. Both phase A and phase D correspond to phase U. The phase current Iu of phase U, which is the combination of phase A and phase D, is thus the combination of the phase current Ifa of phase A and the phase current Ifd of phase D. As illustrated in FIG. 6, the phase current Iu of phase U fluctuates with a certain period. The phase current Iv of phase V and the phase current Iw of phase W can be obtained in the same manner as the phase current Iu of phase U. The three-phase drive currents are applied to phase U, phase V, and phase W of the rotary electric machine 1, as described above, thereby making it possible to perform typical three-phase vector control.

The control unit 103 makes it possible for the field voltage generation unit 113 to produce, separately and independently, the field voltage command values +Vf, −Vf, +Vf, −Vf, +Vf, and −Vf corresponding to the respective six phases of phase A to phase F. The controller 100, thus, can separately and independently control the field voltages applied to the respective windings 3C of the rotary electric machine 1, thereby making it possible to increase a degree of freedom of controlling the rotary electric machine 1. The controller 100 can change torque generated by the rotary electric machine 1 and a characteristic of the torque, specifically a way of change in torque with respect to a rotation speed, by changing the field voltages applied to the respective windings 3C of the rotary electric machine 1. In addition, the single controller 100 including the single inverter 105 controls the rotary electric machine 1. The rotary electric machine 1, thus, does not need separated devices for field magnetic flux control and armature magnetic flux control. As a result, the rotary electric machine 1 allows the simple device to control both of the field magnetic flux and the armature magnetic flux.

Figure 7:
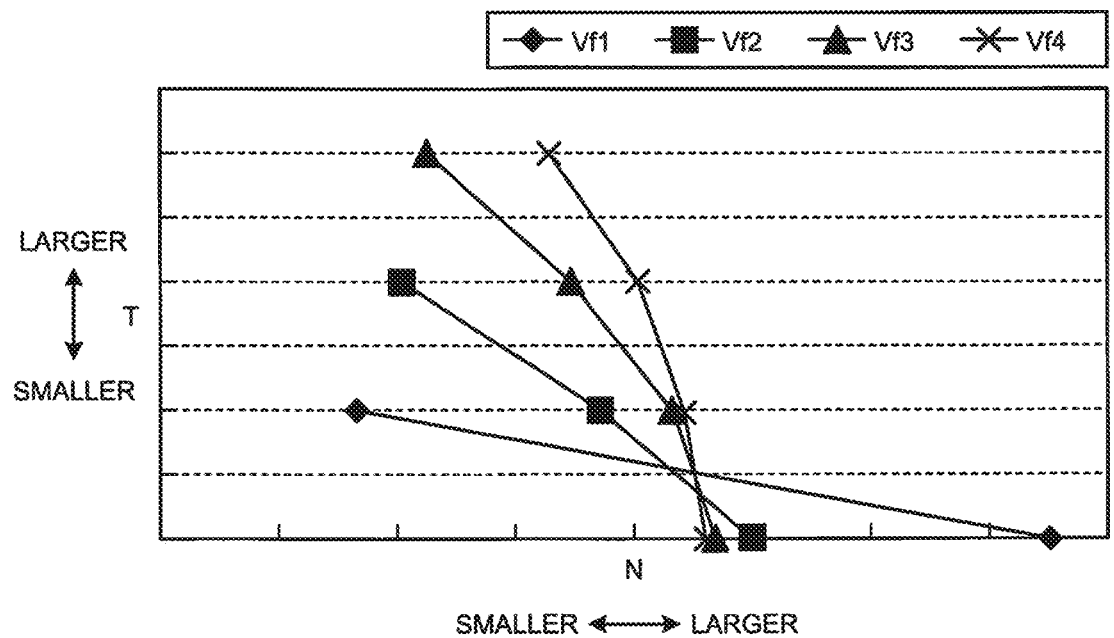
FIG. 7 is a schematic diagram illustrating a relation between a rotation speed and torque of the rotary electric machine according to the first embodiment.

FIG. 7 is a schematic diagram illustrating a result of an evaluation on a relation between a rotation speed N and a torque T of the rotary electric machine 1 according to the first embodiment. FIG. 7 illustrates, as an N-T curve, a result of the evaluation on the change in the torque T with respect to the rotation speed N of the rotary electric machine 1 with the different field voltages. In the evaluation, the field voltage Vf is changed in such a manner that the field voltage Vf becomes larger in the order of Vf1, Vf2, Vf3, and Vf4. It can be seen that the torque T is increased at the same rotation speed N when the field voltage Vf is changed in the order of Vf1, Vf2, Vf3, and Vf4. It can also be seen that a way of the change in the torque T with respect to the rotation speed N differs depending on the changed field voltage. Specifically, when the field voltage of the rotary electric machine 1 is increased, a torque constant is increased, resulting in a non-load rotation speed, i.e., the rotation speed when the torque T is zero, being decreased. As a result, the gradient of the N-T curve becomes steep. As described above, the controller 100 can change the torque T generated by the rotary electric machine 1 and the characteristic of the N-T curve by changing the field voltage Vf applied to each winding 3C of the rotary electric machine 1.

Figure 8:
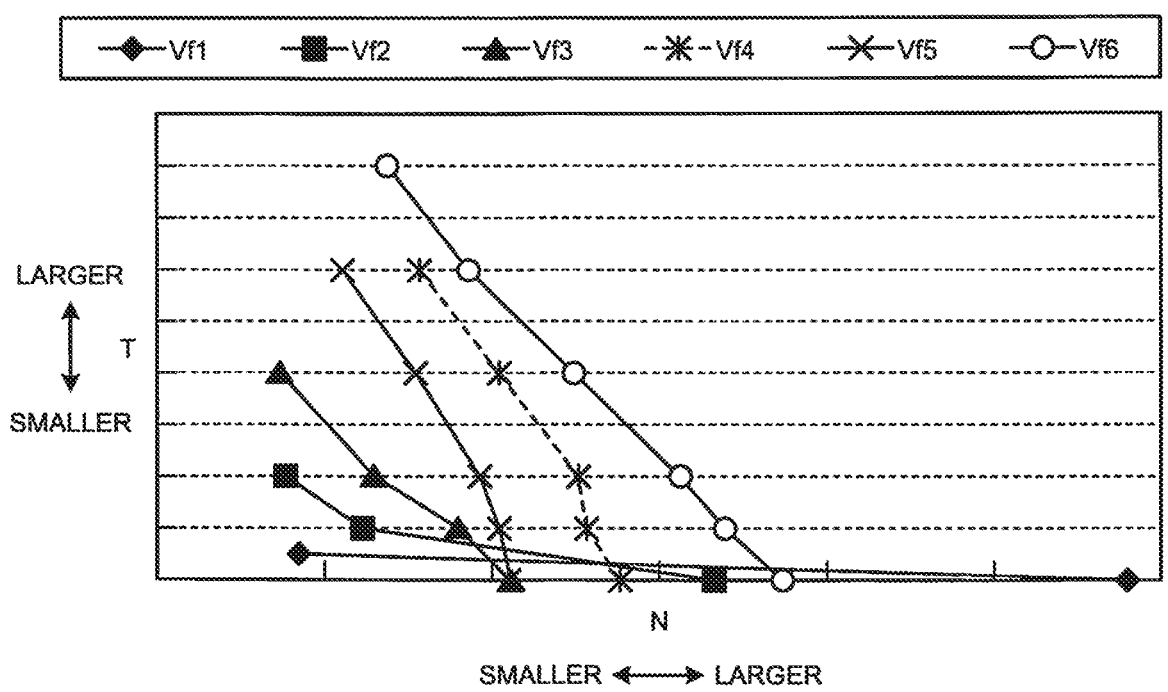
FIG. 8 is a schematic diagram illustrating a result of an evaluation on the relation between the rotation speed and the torque of the rotary electric machine according to the first embodiment when a field voltage is more increased than the example illustrated in FIG. 7.

FIG. 8 is a schematic diagram illustrating a result of the evaluation on the relation between the rotation speed N and the torque T of the rotary electric machine 1 according to the first embodiment when the field voltage is more increased than the example illustrated in FIG. 7. The field voltage Vf becomes larger in the order of Vf1, Vf2, Vf3, Vf4, Vf5, and Vf6. When the field voltage is further increased than Vf4, the rotation speed N and the torque T of the rotary electric machine 1 are increased. That is, the output of the rotary electric machine 1 is increased. When the field voltage is further increased than Vf4, the non-load rotation speed is increased.

When the field voltage is increased, the magnetic flux of the armature is increased. As a result, the non-load rotation speed is decreased. When the field voltage is further increased, the rotor 2 and the stator 3 are magnetically saturated by the field magnetic flux. As a result, the magnetic flux of the armature is decreased. The increase in magnetic flux of the armature and a decrease in permeability of the rotor 2 and the stator 3 due to the magnetic saturation thereof simultaneously occur. When the field voltage is low, the increase in magnetic flux of the armature is dominant. When the field voltage is high, the decrease in permeability of the rotor 2 and the stator 3 due to the magnetic saturation thereof is dominant.

Figure 9:
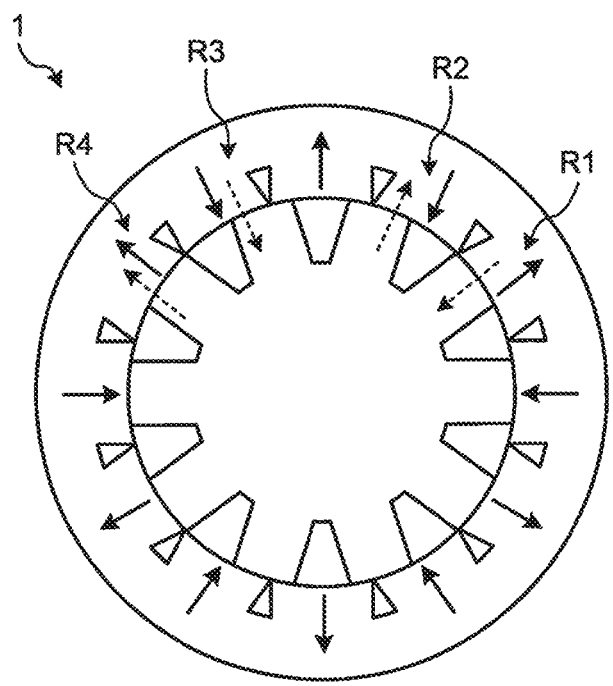
FIG. 9 is a schematic diagram illustrating armature magnetic flux and field magnetic flux of the rotary electric machine.

FIG. 9 is a schematic diagram illustrating the armature magnetic flux and the field magnetic flux of the rotary electric machine. In FIG. 9, the actual line arrows represent the field magnetic flux while the broken line arrows represent the armature magnetic flux. In the rotary electric machine 1, positive torque and negative torque are balanced in only the field magnetic flux or in only the armature magnetic flux. As a result, combined torque becomes zero. In regions R1 and R2, the direction of the armature magnetic flux and the direction of the field magnetic flux are opposite to each other. With an increase in armature current, i.e., drive current, the magnetic flux is decreased, thereby decreasing the negative torque. In regions R3 and R4, the direction of the armature magnetic flux and the direction of the field magnetic flux are the same. With an increase in armature current, the magnetic flux is increased, thereby increasing the positive torque. The rotary electric machine 1 in the embodiment rotates by unbalancing the balance between the positive torque and the negative torque by the field magnetic flux, as described above. The magnetic flux of the armature increases the positive torque by the field magnetic flux and decreases the negative torque.

When the field voltage is relatively small, e.g., Vf3 in the result illustrated in FIG. 8, the armature magnetic flux and the field magnetic flux are offset with each other in a certain large value of the armature current. As a result, the magnetic flux generating the negative torque becomes almost zero in the rotary electric machine 1. When the armature current exceeds the certain large value, the magnetic flux of the armature becomes larger than the field magnetic flux. As a result, the magnetic flux of the armature produces the magnetic flux generating the negative torque. The field magnetic flux, which causes the rotary electric machine 1 to generate the positive torque, is magnetically saturated. With the increase in the armature current, the torque of the rotary electric machine 1 is decreased.

When the field voltage is relatively large, e.g., the field voltage equal to or larger than Vf5 in the result illustrated in FIG. 8, the field magnetic flux does not become zero even when the armature current is increased. As a result, the negative torque by the field magnetic flux is generated. That is, the positive torque is constant and the negative torque continues to be decreased even when the armature current is further increased. As a result, the total torque is increased.

The rotary electric machine 1 rotates by increasing the positive torque generated by the field magnetic flux and decreasing the negative torque. In the rotary electric machine 1, as the increase in the armature current, the negative torque is decreased even when saturation is achieved by only the field magnetic flux. In this case, the positive torque by the armature magnetic flux is hardly generated. When the field voltage is further increased, the magnetic saturation of the rotor 2 and the stator 3 progresses. As a result, the non-load rotation speed converges on a certain value. With a flow of the armature current, the negative torque by the field magnetic flux is decreased, but the positive torque is not changed due to the magnetic saturation. The rotary electric machine 1, thus, generates a maximum torque when the negative torque becomes zero. When compared with a switched reluctance (SR) motor, the rotary electric machine 1 can increase the output even when the field voltage is increased beyond the value at which the output of the SR motor is not increased.

In the embodiment, the rotary electric machine 1 modulates the magnetic field generated by the windings 3C functioning as the field windings by the salient poles 2T of the rotor 2, and synchronizes the modulated magnetic field with the magnetic field generated by the windings 3C functioning as the armature windings to rotate the rotor 2. The order of the magnetic flux modulated by the salient poles 2T and the order of the magnetic flux of the armature are, thus, equal to each other. The rotary electric machine 1 has the 6×n number of windings 3C. Let the number of salient poles 2T of the rotor 2 be m and the order of the field magnetic flux be k, the order of the magnetic flux modulated by the salient poles 2T is obtained as m−k. Let the order of the magnetic flux of the armature be P, then a relation of m−k=p holds. p is the order of the magnetic flux of the armature generated when the drive signals for driving the rotary electric machine 1 as a three-phase rotary electric machine are applied to the windings 3C. k, m, n, and p are natural numbers each equal to or larger than one. When the relation is satisfied, the rotary electric machine 1 is driven by the combined drive signals and the magnitude of the torque T and the characteristic of the torque T are changed.

In the example illustrated in FIG. 1, the order k of the field magnetic flux is 6 because p=4 and m=10. When the order p of the magnetic flux of the armature is 2 and the order k of the field magnetic flux is 6, the number m of salient poles 2T of the rotor 2 is 8. When the order p of the magnetic flux of the armature is 5 and the order k of the field magnetic flux is 6, the number m of salient poles 2T of the rotor 2 is 11.

(First Modification)

Figure 10:
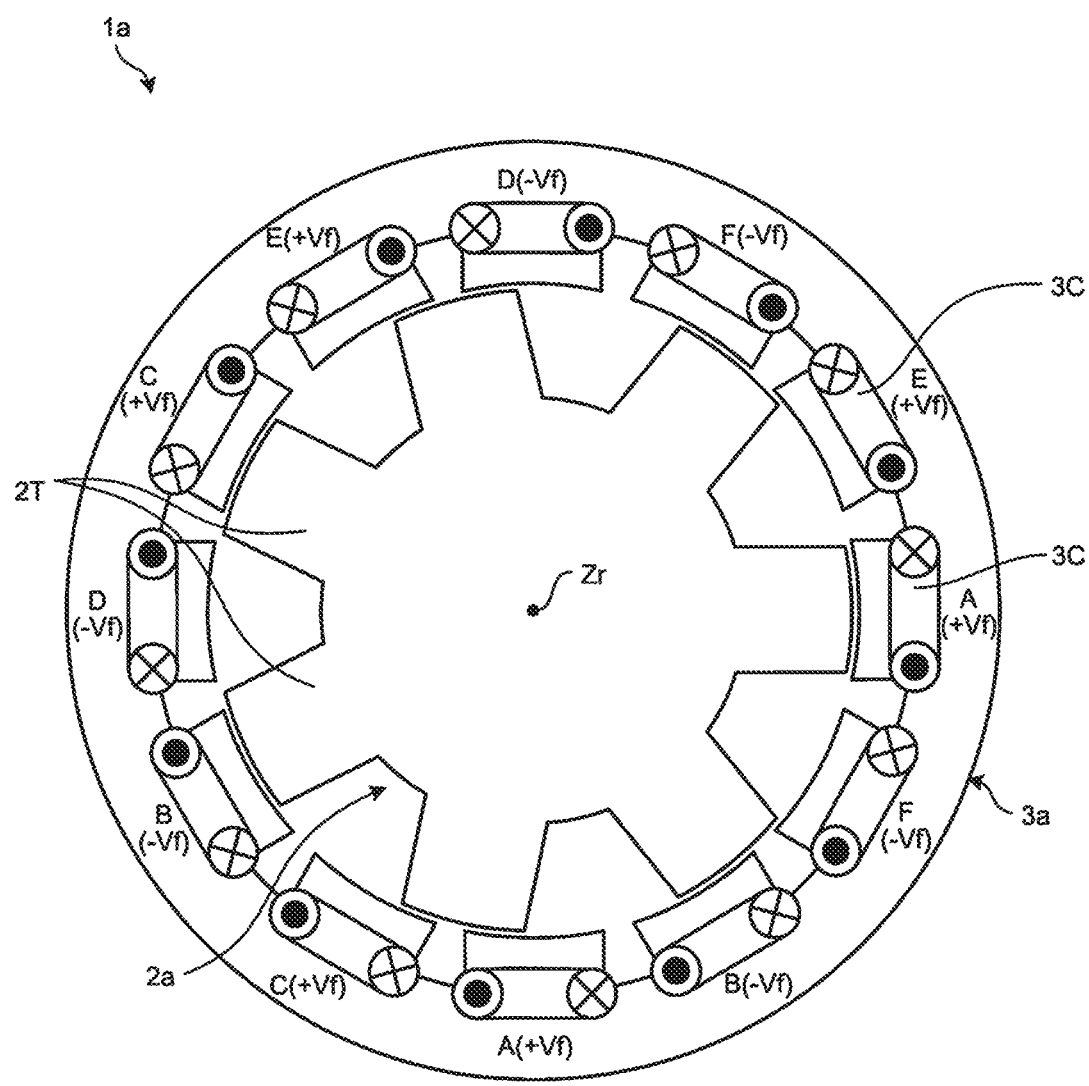
FIG. 10 is a cross-sectional view taken by cutting a rotary electric machine according to a first modification of the first embodiment with a plane passing through and including the rotation axis thereof.

FIG. 10 is a cross-sectional view taken by cutting a rotary electric machine 1a according to a first modification of the first embodiment with a plane passing through and including the rotation axis Zr. The rotary electric machine 1a has the same structure as the rotary electric machine 1 illustrated in FIG. 1 except for that the number m of salient poles 2T of a rotor 2a is 7 and the order k of the field magnetic flux is 3. The order p of the magnetic flux of the armature is, thus, 4. In the rotary electric machine 1a, the number of salient poles 2T of the rotor 2a is smaller than the number of salient poles 2T of the rotor 2 in the rotary electric machine 1. A change in magnetic flux at a certain point when the rotor 2a of the rotary electric machine 1a rotates is smaller than that when the rotor 2 of the rotary electric machine 1 rotates. As a result, an eddy current generated in the rotor 2a is smaller than that generated in the rotor 2. The rotary electric machine 1a is, thus, more preferable than the rotary electric machine 1 for high speed rotation.

For setting the order k of the field magnetic flux to be 3, the windings 3C along the circumferential direction of a stator 3a are arranged, in terms of phase, in the order of phase A, phase E, phase F, phase D, phase E, phase C, phase D, phase B, phase C, phase A, phase B, and phase F. The field voltages along the circumferential direction of the stator 3a are in the order of +Vf, +Vf, −Vf, −Vf, +Vf, +Vf, −Vf, −Vf, +Vf, +Vf, −Vf, and −Vf. As a result of such arrangements, the order k of the field magnetic flux is 3.

(Second Modification)

Figure 11:
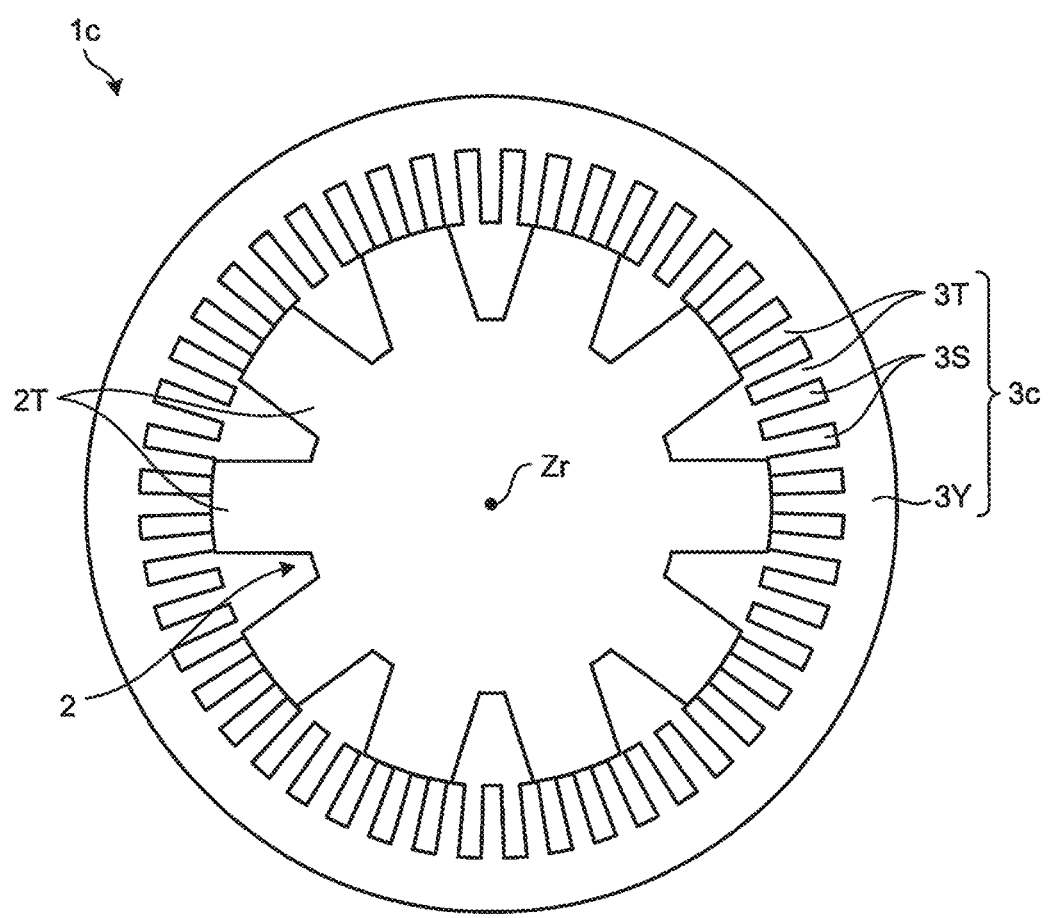
FIG. 11 is a cross-sectional view taken by cutting a rotary electric machine according to a second modification of the first embodiment with a plane passing through and including the rotation axis thereof.

FIG. 11 is a cross-sectional view taken by cutting a rotary electric machine 1c according to a second modification of the first embodiment with a plane passing through and including the rotation axis Zr. In FIG. 11, the windings are omitted. In the rotary electric machine 1c, the number m of salient poles 2T of the rotor 2 is 10, the number of salient poles 3T provided to the yoke 3Y of a stator 3c is 48, and the number of slots 3S of the stator 3c is 48. The windings are provided to the stator 3c by distributed winding. In the rotary electric machine 1c, the order p of the magnetic flux of the armature is 4 because the order k of the field magnetic flux is 6. In the rotary electric machine 1c including the windings provided by distributed winding, a relation of m−k=p can hold. The rotary electric machine 1c is, thus, driven by the combined drive signals and the magnitude of the torque T and the characteristic of the torque T are changed.

The constituent elements of the embodiment and the modifications thereof can also be appropriately combined in the following embodiment.

Second Embodiment

Figure 12:
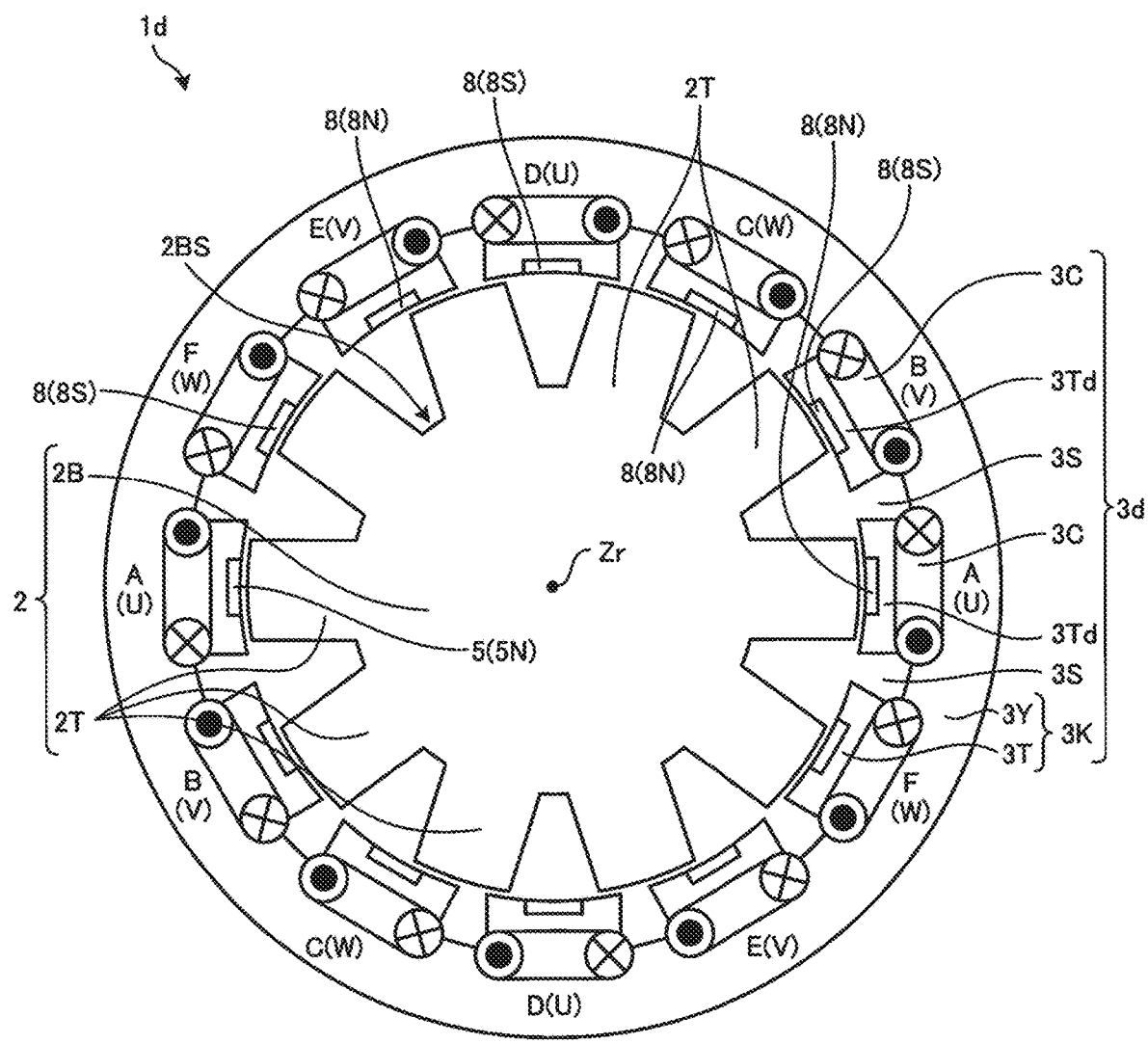
FIG. 12 is a cross-sectional view taken by cutting a rotary electric machine according to a second embodiment with a plane passing through and including a rotation axis Zr thereof.

FIG. 12 is a cross-sectional view taken by cutting a rotary electric machine 1d according to a second embodiment with a plane passing through and including the rotation axis Zr. The rotary electric machine 1d has the same structure as the rotary electric machine 1 in the first embodiment except for a stator 3d. In the rotary electric machine 1d, a permanent magnet 8 is provided to each of salient poles 3Td of the stator 3d. The permanent magnet 8 is provided on the rotor 2 side of the salient pole 3Td.

The respective salient poles 3Td each provided with the permanent magnet 8 are arranged along the circumferential direction of the stator 3d. N-pole permanent magnets 8N and S-pole permanent magnets 8S are arranged alternately along the circumferential direction of the stator 3d. In the rotary electric machine 1d, the order of the field magnetic flux generated by the permanent magnets 8 is 6 and the number of salient poles 2T of the rotor 2 is 10, and thus, the order of the magnetic flux modulated by the salient poles 2T of the rotor 2 is 10−6=4. The order of the magnetic flux of the armature generated when the drive signals for driving the rotary electric machine 1d as a three-phase rotary electric machine are applied to the windings 3C is, thus, 4. The order of a rotation magnetic field that rotates the rotor 2 is, thus, 4. In the rotary electric machine 1d, the rotor 2 is rotated by only the field magnetic flux by the permanent magnets 8.

Figure 13:
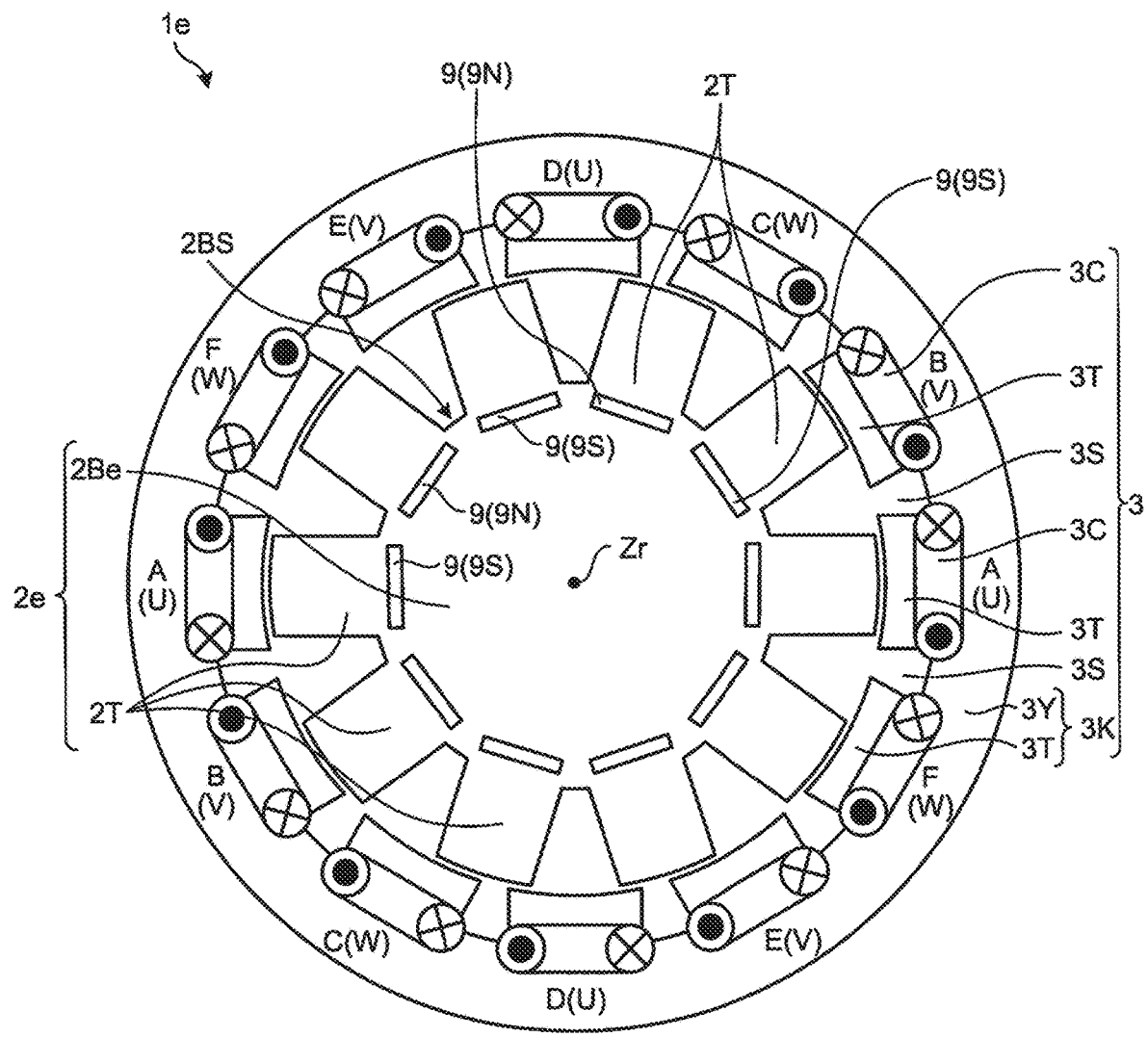
FIG. 13 is a cross-sectional view taken by cutting another rotary electric machine according to the second embodiment with a plane passing through and including the rotation axis thereof.

FIG. 13 is a cross-sectional view taken by cutting a rotary electric machine 1e according to the second embodiment with a plane passing through and including the rotation axis Zr. The rotary electric machine 1e has the same structure as the rotary electric machine 1 in the first embodiment except for a rotor 2e. In the rotary electric machine 1e, permanent magnets 9 are embedded in a main body 2Be of the rotor 2e such that each permanent magnet 9 corresponds to one of the salient poles 2T. N-pole permanent magnets 9N and S-pole permanent magnets 9S are arranged alternately along the circumferential direction of the rotor 2e. In the rotary electric machine 1e, the order of the field magnetic flux generated by the permanent magnets 9 is 6 and the number of salient poles 2T of the rotor 2e is 10, and thus, the order of the magnetic flux modulated by the salient poles 2T of the rotor 2e is 10−6=4. The order of the magnetic flux of the armature generated when the drive signals for driving the rotary electric machine 1e as a three-phase rotary electric machine are applied to the windings 3C is, thus, 4. The order of a rotation magnetic field that rotates the rotor 2 is, thus, 4. In the rotary electric machine 1e, the rotor 2 is rotated by only the field magnetic flux by the permanent magnets 9.

Figure 14:
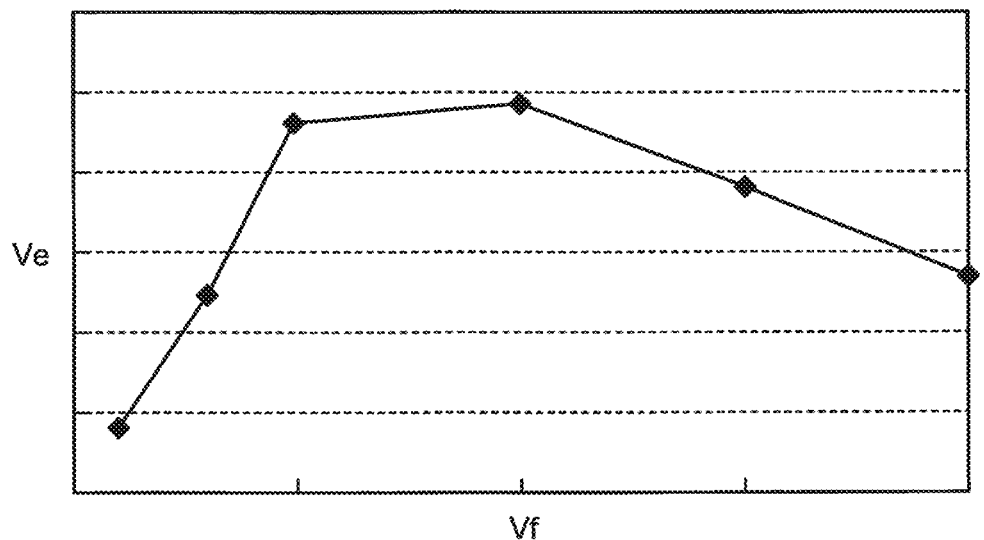
FIG. 14 is a schematic diagram illustrating a relation between an inductive voltage and the field voltage of the rotary electric machine according to the first embodiment.
Figure 15:
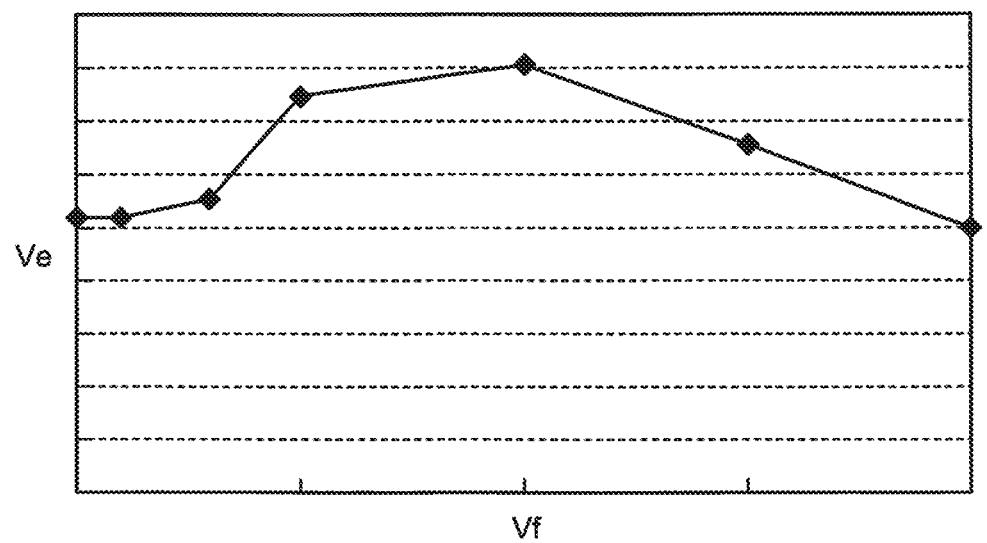
FIG. 15 is a schematic diagram illustrating a relation between the inductive voltage and the field voltage of the rotary electric machines according to the second embodiment.
Figure 16:
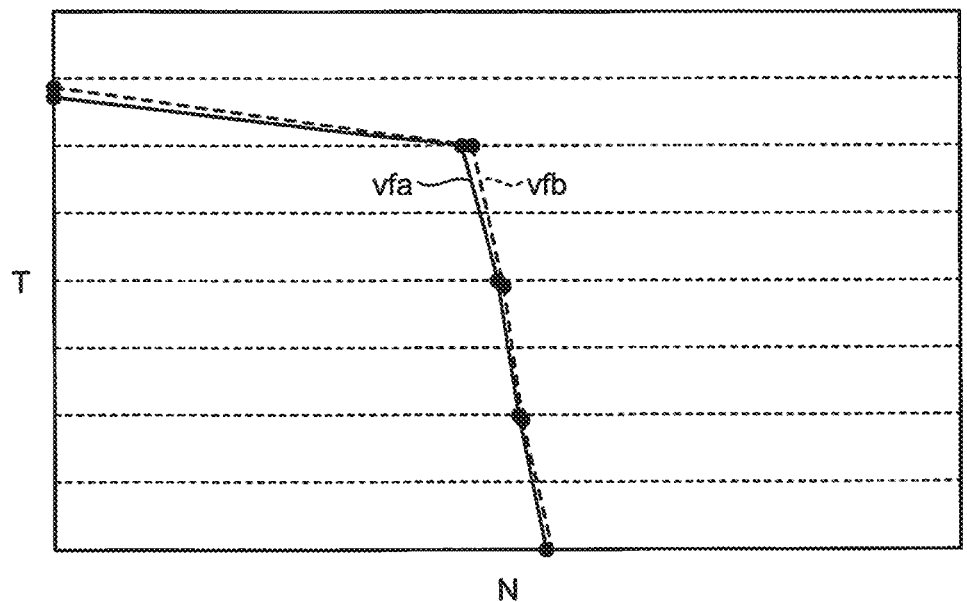
FIG. 16 is a schematic diagram illustrating a relation between the inductive voltage and the field voltage of the rotary electric machines according to the second embodiment.
Figure 17:
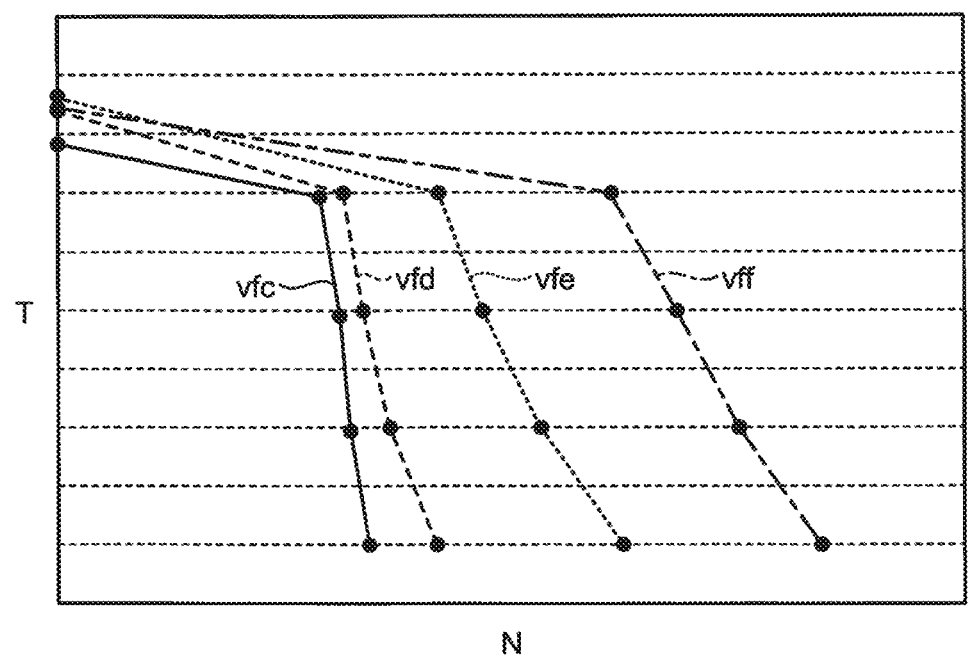
FIG. 17 is a schematic diagram illustrating a relation between the torque and the rotation speed of the rotary electric machines according to the second embodiment when the field voltage is changed.

FIG. 14 is a schematic diagram illustrating a relation between an inductive voltage Ve and the field voltage Vf of the rotary electric machine 1 according to the first embodiment. FIG. 15 is a schematic diagram illustrating a relation between the inductive voltage Ve and the field voltage Vf of the rotary electric machines 1d and 1e according to the second embodiment. FIG. 16 is a schematic diagram illustrating a relation between the torque N and the rotation speed N of the rotary electric machines 1d and 1e according to the second embodiment in relation to the presence or absence of the field voltage Vf. FIG. 17 is a schematic diagram illustrating a relation between the torque N and the rotation speed N of the rotary electric machines 1d and 1e according to the second embodiment when the field voltage Vf is changed.

As illustrated in FIG. 15, the magnetic flux of the permanent magnets 8 and 9 is dominant when the field voltage Vf is small and the inductive voltage Ve is substantially constant in the rotary electric machines 1d and 1e according to the second embodiment. In the rotary electric machines 1d and 1e, when the field voltage Vf is increased, the inductive voltage Ve reaches the peak value, and thereafter with the increase in the field voltage Vf, the inductive voltage Ve is decreased in the same manner as the rotary electric machine 1 in the first embodiment illustrated in FIG. 14. In the rotary electric machines 1d and 1e according to the second embodiment, the peak of the inductive voltage Ve is smaller than that of the rotary electric machine 1 in the first embodiment. This is because the permanent magnets 8 provided to the salient poles 3Td of the stator 3d or the permanent magnets 9 provided to the salient poles 2Te of the rotor 2e serve as magnetic resistance to the field magnetic flux generated by the windings 3C.

FIG. 16 illustrates the N-T curve when the field voltage is Vfa and the N-T curve when the field voltage is Vfb in the rotary electric machines 1d and 1e according to the second embodiment. Vfa is zero volts while Vfa is larger than zero volts. The rotary electric machines 1d and 1e have the same N-T curves. Because the field magnetic flux by the permanent magnets 8 or 9 are generated, the rotary electric machines 1d and 1e have the same N-T characteristic regardless of the presence or absence of the field magnetic flux by the field of the windings 3C. As illustrated in FIG. 17, the output is increased as the field voltage is increased in the order of Vfc, Vfd, Vfe, and Vff in the rotary electric machines 1d and 1e according to the second embodiment. As described above, the rotary electric machines 1d and 1e according to the second embodiment have the same characteristics as the rotary electric machine 1 in the first embodiment.

The constituent elements of the embodiment can also be appropriately combined in the following embodiment.

Third Embodiment

Figure 18:
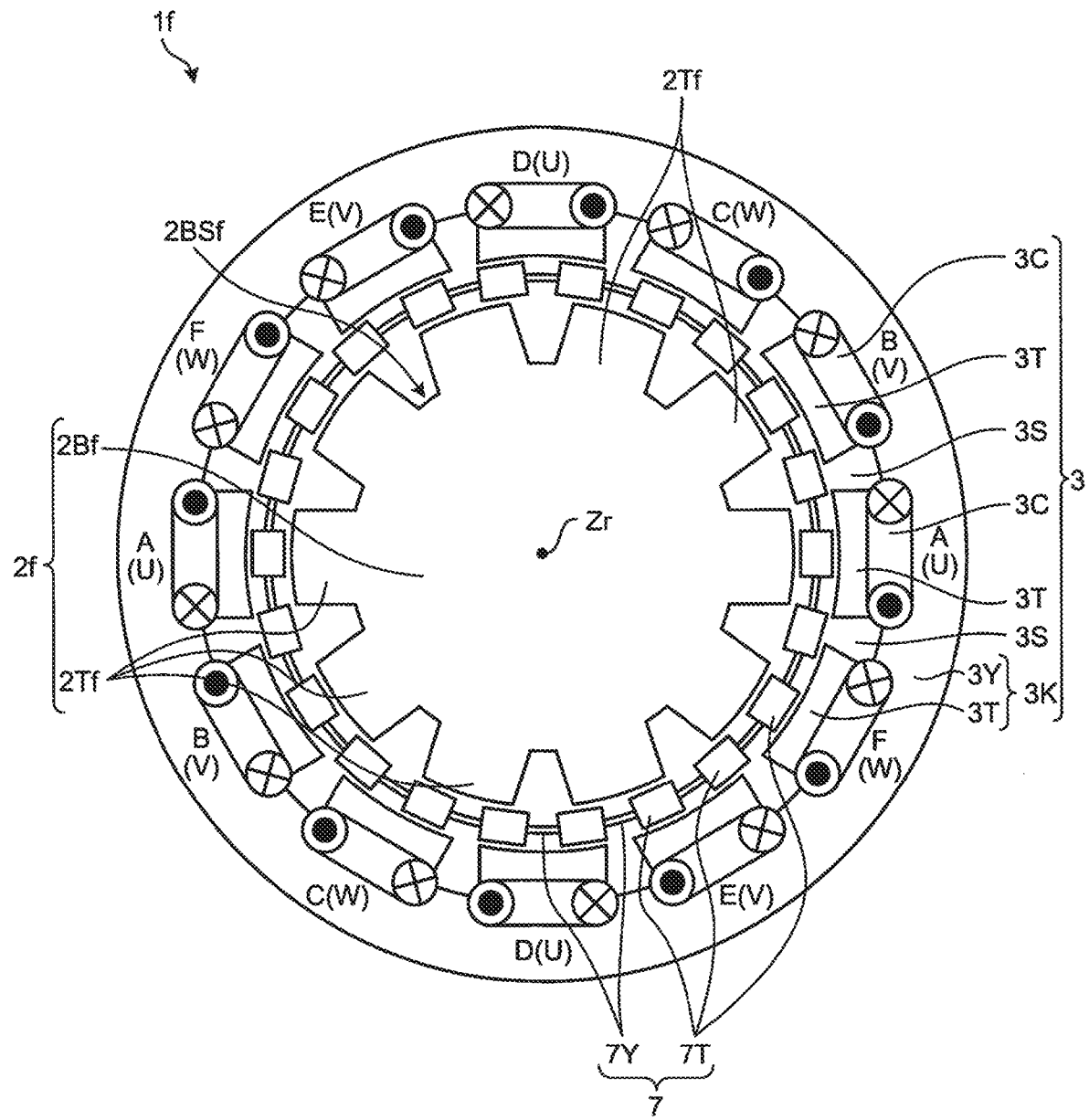
FIG. 18 is a cross-sectional view taken by cutting a rotary electric machine according to a third embodiment with a plane passing through and including the rotation axis thereof.

FIG. 18 is a cross-sectional view taken by cutting a rotary electric machine 1f according to a third embodiment with a plane passing through and including the rotation axis Zr. The rotary electric machine 1f has the same structure as the rotary electric machine 1 according to the first embodiment except for that the rotary electric machine 1f includes a first rotor 2f and a second rotor 7. The structure other than that described above of the rotary electric machine 1f is the same as that of the rotary electric machine 1 according to the first embodiment.

The first rotor 2f rotates around the rotation axis Zr serving as the center. The first rotor 2f has a main body 2Bf and a plurality of first magnetic poles 2Tf. The multiple first magnetic poles 2Tf protrude from a surface 2BSf of the main body 2Bf in directions perpendicular to the rotation axis Zr. In the embodiment, the rotor 2 is provided with 10 first magnetic poles 2Tf. The number of first magnetic poles 2Tf is, however, not limited to 10. The first rotor 2f is manufactured by layering magnetic steel sheets, for example.

The second rotor 7 is a structural body having a plurality of second magnetic poles 7T arranged in an annular shape. The second rotor 7 is disposed radially outside the first rotor 2f and rotates around the rotation axis Zr serving as the center. The number of second magnetic poles 7T provided to the second rotor 7 is larger than the number of first magnetic poles 2Tf provided to the first rotor 2f. In the embodiment, the number of second magnetic poles 7T is 22. In the embodiment, the multiple second magnetic poles 7T forms the second rotor 7 serving as the annular structural body in such a manner that the adjacent second magnetic poles 7T are connected with a connection member 7Y. The second rotor 7 is manufactured by layering magnetic steel sheets, for example. When the rotary electric machine 1f is used as an electric motor, the output of the rotary electric machine 1f is taken out from the second rotor 7. When the rotary electric machine 1f is used as an electric generator, power for causing the rotary electric machine 1f to generate electric power is input to the second rotor 7.

The stator 3 has the same structure as that of the rotary electric machine 1 according to the first embodiment. The description thereof is thus omitted. The field signals for generating the field magnetic flux and the drive signals for driving the first rotor 2f and the second rotor 7 as a three-phase rotary electric machine are superimposed on one another and the resulting signals are input to the windings 3C of the stator 3. The rotary electric machine 1f is controlled by the controller 100 (refer to FIG. 2) that controls the rotary electric machine 1 according to the first embodiment. The rotary electric machine 1f is controlled by the six-phase inverter 105.

The field voltage, which is a direct-current voltage, and the armature voltage for causing the rotary electric machine 1f to rotate as a three-phase rotary electric machine are superimposed on each other and the resulting signal is input to each phase of the rotary electric machine 1f. As a result, the first rotor 2f of the rotary electric machine 1f rotates. The second rotor 7 of the rotary electric machine 1f rotates by utilizing the magnetic flux of the field voltages applied to the respective phases of the rotary electric machine 1f as a magnetic force source of a magnetic gear.

The rotary electric machine 1f is controlled by the controller 100 in the first embodiment. In this case, the controller 100 controls the rotary electric machine 1f by the same processing as the processing that controls the rotary electric machine 1 in the first embodiment. The controller 100 performs superimposition of the field signals for causing the rotary electric machine 1f to generate the field magnetic flux and the drive signals for driving the rotary electric machine 1f as a three-phase rotary electric machine and thereafter applies the resulting signals to the windings 3C of the rotary electric machine 1f.

Let the number of first magnetic poles 2Tf of the first rotor 2f be m1 and the order of the field magnetic flux be k, then the order of harmonic magnetic flux generated as a result of the first magnetic poles 2Tf of the first rotor 2f modulating the field magnetic flux can be obtained as m1±k. Let the number of second magnetic poles 7T of the second rotor 7 be m2 and the order of the field magnetic flux be k, then the order of harmonic magnetic flux generated as a result of the second magnetic poles 7T of the second rotor 7 modulating the field magnetic flux can be obtained as m2±k. In the embodiment, m1=10, m2=22, and k=6, thus, the order of the harmonic magnetic flux generated as a result of the first magnetic poles 2Tf of the first rotor 2f modulating the field magnetic flux is 4 or 10 while the order of harmonic magnetic flux generated as a result of the second magnetic poles 7T of the second rotor 7 modulating the field magnetic flux is 16 or 28.

Figure 19:
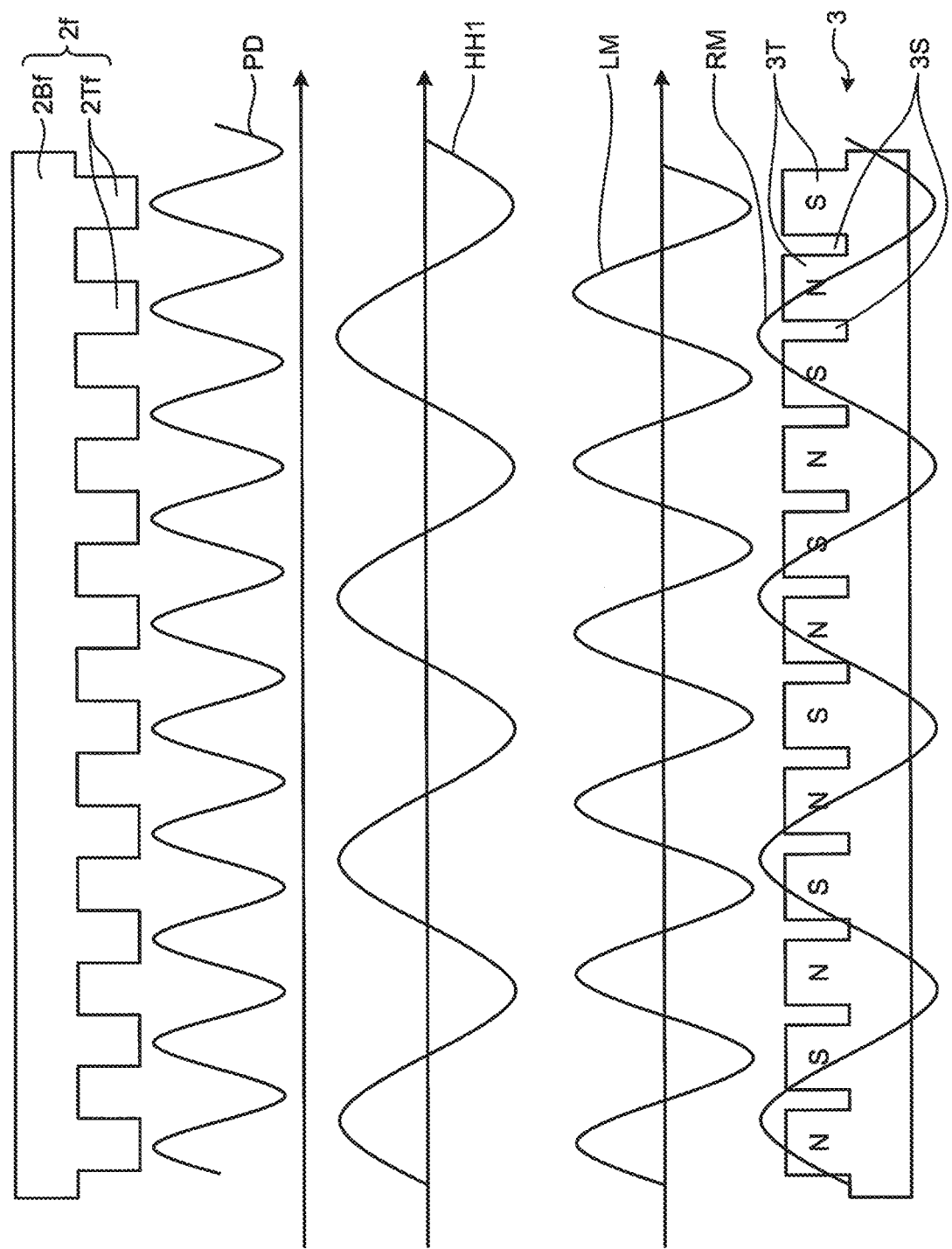
FIG. 19 is a schematic diagram for explaining the rotation principle of a first rotor.

FIG. 19 is a schematic diagram for explaining the rotation principle of the first rotor 2f. In the embodiment, the first rotor 2f is provided with 10 first magnetic poles 2Tf. The order of a permeance distribution (curve PD in FIG. 19) is 10. As described above, the stator 3 is provided with 12 slots 3S, 12 salient poles 3T, and the windings 3C illustrated in FIG. 18 provided to the respective slots 3S. The field voltages are applied to phase A, phase B, phase C, phase D, phase E, and phase F in the stator 3. The order of the field magnetic flux is, thus, 6 (curve LM in FIG. 19). The order of the harmonic magnetic flux generated as a result of the first magnetic poles 2Tf of the first rotor 2f modulating the field magnetic flux is 4 in the low order harmonic magnetic flux (curve HH1 in FIG. 19). The drive voltages Vv, Vu, and Vw for causing the stator 3 to generate the fourth order rotation magnetic flux indicated by curve RM in FIG. 19 are applied to the respective windings 3C of the stator 3. As a result, the fourth order rotation magnetic field generated by the stator 3 and the fourth order harmonic magnetic flux generated as a result of the first magnetic poles 2Tf modulating the field magnetic flux are synchronized, thereby causing the first rotor 2f to rotate.

Figure 20:
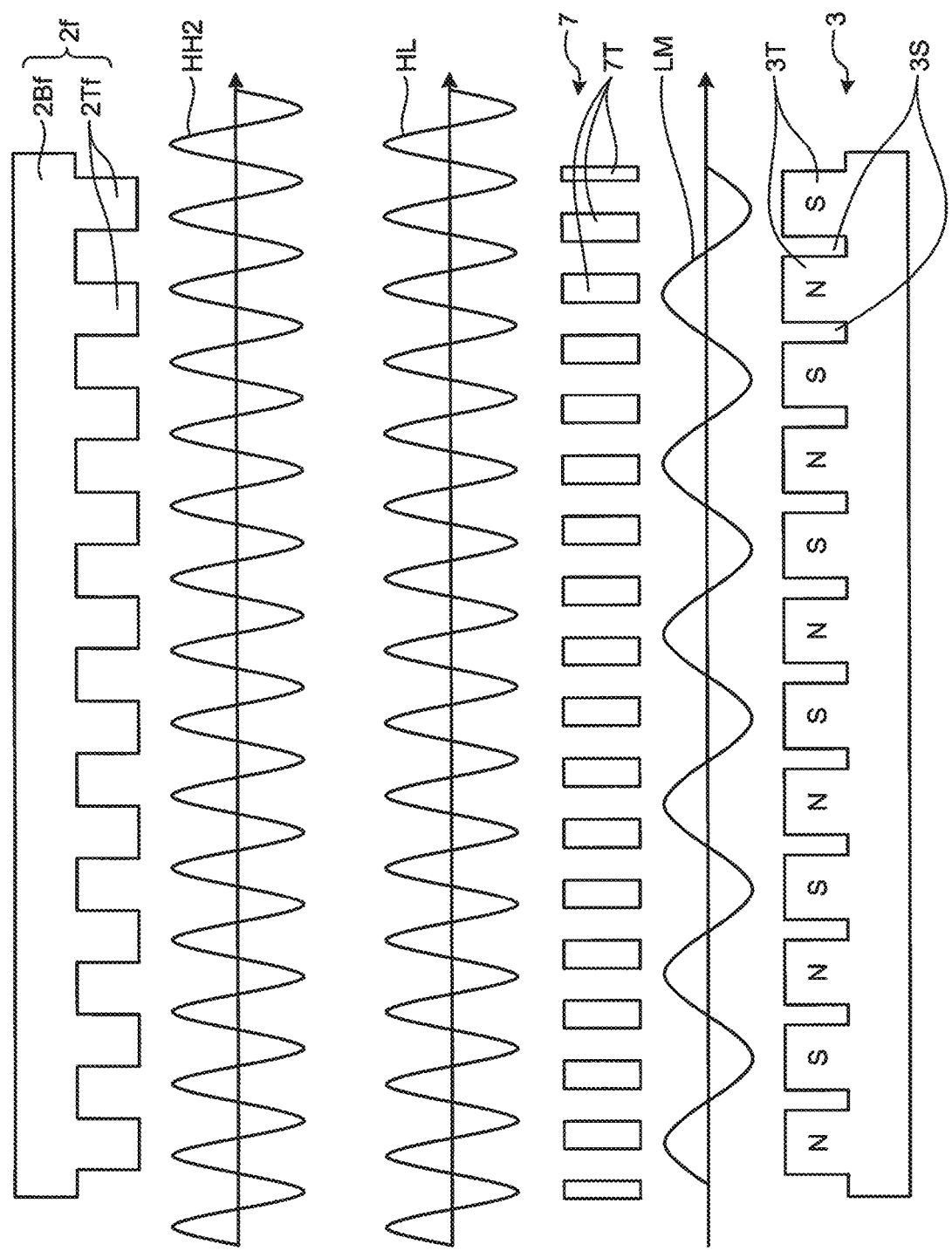
FIG. 20 is a schematic diagram for explaining the rotation principle of the first rotor.

FIG. 20 is a schematic diagram for explaining the rotation principle of the second rotor 7. In the embodiment, the second rotor 7 has 22 second magnetic poles 7T. The order of the harmonic magnetic flux generated as a result of the second magnetic poles 7T of the second rotor 7 modulating the field magnetic flux is 16 in the low order harmonic magnetic flux (curve HL in FIG. 20). The order of the field magnetic flux by the stator 3 is 6 (curve LM in FIG. 20). As a result, the 16th order harmonic magnetic flux, which is high order harmonic magnetic flux generated as a result of the first magnetic poles 2Tf of the first rotor 2f modulating the field magnetic flux, and the 16th order harmonic magnetic flux generated as a result of the second magnetic poles 7T of the second rotor 7 modulating the field magnetic flux are synchronized, thereby causing the second rotor 7 to rotate.

Let the order of the magnetic flux of the armature generated when the drive signals for driving the rotary electric machine 1f as a three-phase rotary electric machine are applied to the windings 3C of the stator 3 be p, the following relation holds: m1=k+p and m2=2×k+m1. n, p, m1, m2, and k are natural numbers each equal to or larger than one. p is the order of the low order harmonic magnetic flux generated as a result of the first magnetic poles 2Tf of the first rotor 2f modulating the field magnetic flux. The second rotor 7 rotates with a rotation speed lower than that of the first rotor 2f. Let a reduction ratio be Gr, then Gr=m2/m1 holds.

(Evaluation)

The rotary electric machine 1f in the embodiment was evaluated. The specifications of the rotary electric machine 1 subjected to the evaluation were as follows: the stator 3 had 12 slots, the stator 3 had a diameter of 220 mm and a thickness of 70 mm, the number of first magnetic poles 2Tf of the first rotor 2f was 10, the number of second magnetic poles 7T of the second rotor 7 was 22, and the number of turns of winding 3C was 20, and the winding 3C had a resistance of 0.0155Ω. The order of the field magnetic flux was 6 and the order of the magnetic flux (rotation magnetic flux) of the armature was 4 in the rotary electric machine 1f. The rotary electric machine 1f was evaluated by numerical simulation in electromagnetic analysis using a computer. Prior to the evaluation of the rotary electric machine 1f, an analysis model of the rotary electric machine 1f based on a finite element method was created using a computer, for example. The created analysis model was rotated in the simulation in the electromagnetic analysis using the computer to evaluate the characteristic values such as the rotation speed N and the torque T of the rotary electric machine 1f.

Figure 21:
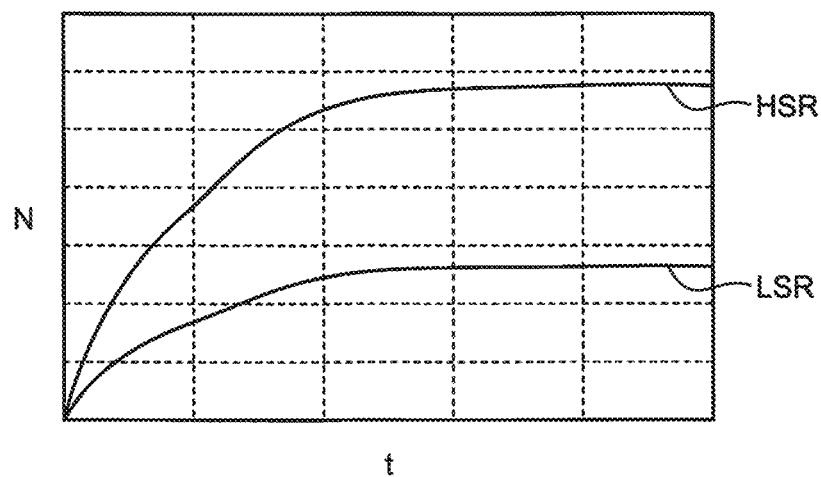
FIG. 21 is a schematic diagram illustrating a temporal change in the rotation speeds of the first rotor and the second rotor.

FIG. 21 is a schematic diagram illustrating a temporal change in the rotation speed N of each of the first rotor 2f and the second rotor 7. In FIG. 21, time t=0 indicates the timing when the rotary electric machine 1f started rotation. As time t elapsed, the rotation speed N of each of the first rotor 2f and the second rotor 7 increased and reached a constant value. When the rotation speed N of each of the first rotor 2f and the second rotor 7 became constant, the rotation speed N of the first rotor 2f was 5743 revolutions per minute while the rotation speed N of the second rotor 7 was 2610 revolutions per minute. A speed ratio at that timing, i.e., a ratio Gr of the rotation speed of the first rotor 2f to the rotation speed of the second rotor 7 was 2.20, which is equal to the reduction ratio Gr=m2/m1=22/10=2.2, which is the reduction ratio of the rotary electric machine 1f. On the basis of these results, it was confirmed that the rotary electric machine 1f operates theoretically.

Figure 22:
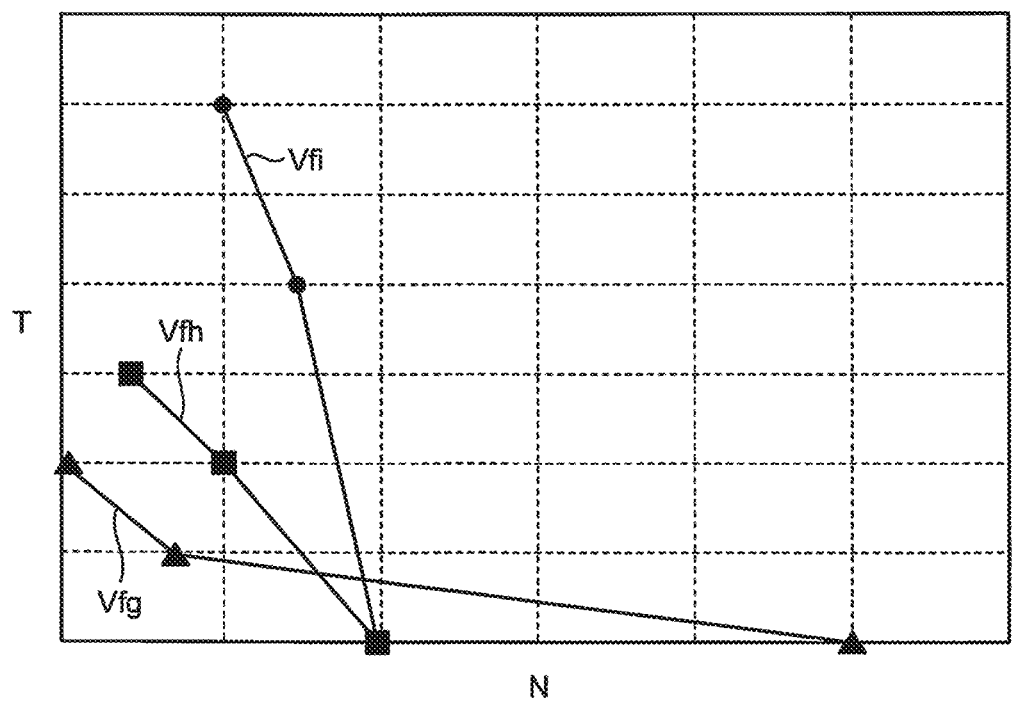
FIG. 22 is a schematic diagram illustrating a relation between the rotation speed and the torque of the rotary electric machine according to the third embodiment when the field voltage is changed.

FIG. 22 is a schematic diagram illustrating the relation between the rotation speed N and the torque T of the rotary electric machine 1f according to the third embodiment when the field voltage was changed. In FIG. 22, the field voltage was increased in the order of Vfg, Vfh, and Vfi. It was found from the result illustrated in FIG. 22 that the N-T characteristic of the rotary electric machine 1f changed by changing the field voltage. Specifically, it was found that as the field voltage increased, the gradient of the N-T curve illustrated in FIG. 22 became larger, i.e., the output of the rotary electric machine 1f became larger.

Figure 23:
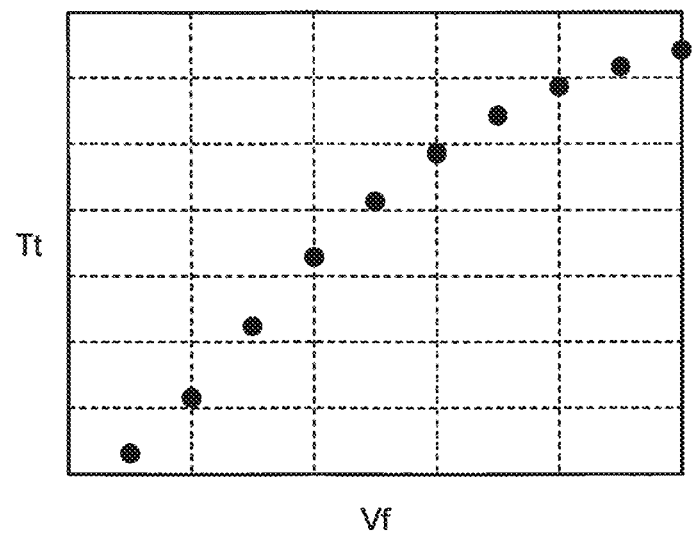
FIG. 23 is a schematic diagram illustrating a relation between the field voltage and a maximum transmission torque of the rotary electric machine according to the third embodiment.

FIG. 23 is a schematic diagram illustrating the relation between the field voltage Vf and a maximum transmission torque Tt of the rotary electric machine 1f according to the third embodiment. As illustrated in FIG. 23, it was found that the maximum transmission torque Tt of the rotary electric machine 1f changed with the change in the field voltage Vf. Specifically, it was found that as the field voltage Vf increased, the maximum transmission torque Tt became larger. The maximum transmission torque Tt is the maximum torque transmitted between the first rotor 2f and the second rotor 7. When torque having a magnitude exceeding the maximum transmission torque Tt is intended to be transmitted, slipping occurs between the first rotor 2f and the second rotor 7 in the rotary electric machine 1f. This slipping reduces the flowing of an eddy current in the windings 3C of the rotary electric machine 1f and the acting of an excess load on the rotary electric machine 1f. The rotary electric machine 1f has a torque limiting function as described above.

The first modification, the modifications thereof, the second modification, and the third modification are described as above. The above description, however, does not limit the first modification, the modifications thereof, the second modification, and the third modification. The constituent elements of the first modification, the modifications thereof, the second modification, and the third modification described above include elements easily envisaged by those skilled in the art and identical elements. The constituent elements described above can also be combined as appropriate. The constituent elements can be omitted, replaced, or changed in various ways without departing from the spirits of the first modification, the modifications thereof, the second modification, and the third modification.

REFERENCE SIGNS LIST 1, 1a, 1c, 1d, 1e, 1f rotary electric machine
2, 2a, 2b rotor
2f first rotor
2B main body
2BS surface
2T salient pole
2Tf first magnetic pole
3, 3a stator
3K stator core
3S slot
3T salient pole
3Y yoke
3C winding
3C winding
3T salient pole
4 output shaft
5 rotation angle sensor
7 second rotor
7T second magnetic pole
100 controller
103 control unit
105 inverter
106 switching element
107 direct-current power source
110 PI control unit
111 three-phase inverse dq conversion unit
112 three-phase dq conversion unit 112
113 field voltage generation unit
114 d-axis current generation unit
115 q-axis current generation unit

The invention claimed is:

1. A rotary electric machine, comprising:
a rotor that rotates around a rotation axis serving as a center and includes a plurality of salient poles protruding in directions perpendicular to the rotation axis; and
a stator that includes an annular structural body disposed radially outside the rotor and surrounding the rotor, and 6×n windings provided along a circumferential direction of the structural body, a field signal for generating field magnetic flux and a drive signal for driving the rotor as a three-phase rotary electric machine being superimposed on each other to be input to each of the windings, n being a natural number equal to or larger than one, wherein m−k=p holds where m is the number of salient poles, k is an order of the field magnetic flux, p is an order of magnetic flux of an armature generated when the drive signals for driving the rotor as the three-phase rotary electric machine are applied to the windings, and p, m, and k are natural numbers each equal to or larger than one, and the electric rotary machine includes a single inverter connected to the stator.

2. The rotary electric machine according to claim 1, wherein the field signal is a direct-current voltage or an alternate-current voltage having a certain period.

3. The rotary electric machine according to claim 1, wherein the field signal is a two phase signal and the drive signal is a three phase signal.

4. The rotary electric machine according to claim 1, further comprising:
an inverter, comprising at least one switching element, configured to receive the field signal and the drive signal; and
a DC power source, wherein
the DC power source is coupled to the inverter.

5. A rotary electric machine, comprising:
a first rotor that rotates around a rotation axis serving as a center and includes a plurality of first magnetic poles protruding in directions perpendicular to the rotation axis;
a second rotor that is provided radially outside the first rotor, includes second magnetic poles the number of which is larger than the number of first magnetic poles, and rotates around the rotation axis as the center; and
a stator that includes an annular structural body disposed radially outside the second rotor and surrounding the second rotor, and 6×n windings provided along a circumferential direction of the structural body, a field signal for generating field magnetic flux and a drive signal for driving the first rotor as a three-phase rotary electric machine being added to each other to be input to each of the windings, wherein
m1=k+p and m2=2×k+m1 hold where m1 is the number of first magnetic poles, m2 is the number of second magnetic poles, k is a value of the field magnetic flux, p is a value of magnetic flux of an armature generated when the drive signals for driving the first rotor as the three-phase rotary electric machine are applied to the windings,
n, p, m1, m2, and k are natural numbers each equal to or larger than one, and the electric rotary machine includes a single inverter connected to the stator.

6. The rotary electric machine according to claim 5, wherein the field signal is a direct-current voltage or an alternate-current voltage having a certain period.

7. The rotary electric machine according to claim 5, wherein the field signal is a two phase signal and the drive signal is a three phase signal.

8. The rotary electric machine according to claim 5, further comprising:
an inverter configured to receive the field signal and the drive signal; and
a DC power source, wherein
the DC power source is coupled to the inverter.

9. A rotary electric machine controller that controls a rotary electric machine including a first rotor rotating around a rotation axis serving as a center and including a plurality of first magnetic poles protruding in directions perpendicular to the rotation axis, a second rotor provided radially outside the first rotor, including second magnetic poles the number of which is larger than the number of first magnetic poles, and rotating around the rotation axis as the center, and a stator including an annular structural body disposed radially outside the second rotor and surrounding the second rotor and 6×n windings provided along a circumferential direction of the structural body, and satisfies m1=k+p and m2=2×k+m1 where m1 is the number of first magnetic poles, m2 is the number of second magnetic poles, k is an order of the field magnetic flux, p is an order of magnetic flux of an armature generated when drive signals for driving the rotary electric machine as a three-phase rotary electric machine are applied to the windings, wherein
the rotary electric machine controller performs superimposition of a field signal for causing the rotary electric machine to generate field magnetic flux and the drive signal for driving the rotary electric machine as the three-phase rotary electric machine, and outputs a signal obtained by the superimposition to each of the windings,
n, p, m1, m2, and k are natural numbers each equal to or larger than one, and the electric rotary machine includes a single inverter connected to the stator.

10. The rotary electric machine controller according to claim 9, wherein the field signal is a two phase signal and the drive signal is a three phase signal.

11. The rotary electric machine controller according to claim 9, wherein the field signal is a two phase signal and the drive signal is a three phase signal.

12. A rotary electric machine controller that controls a rotary electric machine including a rotor rotating around a rotation axis serving as a center and including a plurality of salient poles protruding in directions perpendicular to the rotation axis, an annular structural body disposed radially outside the rotor and surrounding the rotor, and 6×n windings provided along a circumferential direction of the structural body, and satisfies m−k=p where m is the number of salient poles, k is a value of field magnetic flux, p is a value of magnetic flux of an armature generated when drive signals for driving the rotary electric machine as a three-phase rotary electric machine are applied to the windings, wherein
the rotary electric machine controller performs superimposition of a field signal for causing the rotary electric machine to generate the field magnetic flux and the drive signal for driving the rotary electric machine as the three-phase rotary electric machine, and outputs a signal obtained by the superimposition to each of the windings,
p, m, and k are natural numbers each equal to or larger than one, and
the electric rotary machine includes a single inverter connected to the stator.

* * * * *